(12) United States Patent
Shih

(10) Patent No.: US 12,478,461 B2
(45) Date of Patent: Nov. 25, 2025

(54) LASER DEVICE FOR DENTISTRY

(71) Applicant: Jui Yuan Shih, Changhua County (TW)

(72) Inventor: Jui Yuan Shih, Changhua County (TW)

( * ) Notice: Subject to any disclaimer, the term of this patent is extended or adjusted under 35 U.S.C. 154(b) by 766 days.

(21) Appl. No.: 17/719,528

(22) Filed: Apr. 13, 2022

(65) Prior Publication Data
US 2022/0331080 A1 Oct. 20, 2022

(30) Foreign Application Priority Data

Apr. 20, 2021 (TW) ................................ 110114143
Mar. 18, 2022 (TW) ................................ 111110145

(51) Int. Cl.
*A61C 19/00* (2006.01)
*A61C 13/15* (2006.01)
*G02B 27/30* (2006.01)

(52) U.S. Cl.
CPC ............ *A61C 19/004* (2013.01); *G02B 27/30* (2013.01)

(58) Field of Classification Search
CPC .............................. A61C 19/003; A61C 19/004
See application file for complete search history.

(56) References Cited

U.S. PATENT DOCUMENTS

| | | | | |
|---|---|---|---|---|
| 3,941,484 A * | 3/1976 | Dreyfus | ............... | G01B 11/022 |
| | | | | 356/388 |
| 5,634,711 A * | 6/1997 | Kennedy | ................ | A61N 5/062 |
| | | | | 433/29 |
| 6,046,460 A * | 4/2000 | Mertins | ................ | A61C 19/004 |
| | | | | 250/504 R |
| 6,099,520 A * | 8/2000 | Shimoji | ............. | B23K 26/0096 |
| | | | | 606/17 |
| 6,439,888 B1 * | 8/2002 | Boutoussov | ............ | F21V 29/74 |
| | | | | 433/29 |
| 6,692,250 B1 * | 2/2004 | Decaudin | ............. | A61C 19/004 |
| | | | | 433/29 |
| 6,692,251 B1 * | 2/2004 | Logan | ................... | A61C 19/004 |
| | | | | 433/29 |
| 8,382,472 B2 * | 2/2013 | Plank | .................... | A61C 19/004 |
| | | | | 362/120 |
| 9,662,191 B2 * | 5/2017 | Wang | .................... | A61C 19/004 |
| 2002/0190660 A1 * | 12/2002 | Cao | ..................... | B23K 26/0665 |
| | | | | 315/149 |
| 2013/0034824 A1 * | 2/2013 | Wang | .................... | A61C 19/004 |
| | | | | 433/29 |
| 2021/0055213 A1 * | 2/2021 | Kobayashi | ......... | G01N 21/3563 |

* cited by examiner

*Primary Examiner* — Ralph A Lewis
(74) *Attorney, Agent, or Firm* — Best & Flanagan LLP

(57) ABSTRACT

A laser device for dentistry has a body, a light source group, and a light guiding pipe. The body has an outer casing, an operating module, and a controlling module. The light source group is disposed in the body and has multiple light-emitting elements, a reflector, a collimating lens, and a focusing lens. Each light-emitting element is a laser diode, is disposed at a connecting portion of the body and is electrically connected to the controlling module. The reflector is mounted around the light-emitting elements. The collimating lens is disposed on a side of the reflector away from the light-emitting elements. The focusing lens is disposed on a side of the collimating lens away from the reflector. The light guiding pipe is detachably connected to the connecting portion of the body and is located on a front side of the light source group.

67 Claims, 27 Drawing Sheets

LASER DEVICE FOR DENTISTRY

BACKGROUND OF THE INVENTION

1. Field of the Invention

The present invention relates to a laser device for dentistry, and more particularly to a laser device for dentistry that may improve curing effect, may increase practicality, and can be used conveniently.

2. Description of Related Art

Photopolymer, commonly known as light-activated resin, refers to the polymer that can change the properties of the polymer after exposure to light. The light used to excite the polymer can be in the wavelength range from visible light to ultraviolet light, and it has been applied in many fields, such as adding photopolymers to enamels, which can quickly cure enamels after light exposure, and can also be used in medicine and printing. Photopolymers of different materials need to be used with light sources of corresponding wavelengths.

At present, when treating dental caries clinically, the defected part of the dental caries will be treated by filling materials, and the filling materials include silver powder, composite resin or ceramic material. Silver powder has aesthetic problems due to its color, and users may be concerned about the contamination of mercury. Therefore, currently, silver powder is not used as a filling material for teeth in the industry. Ceramic materials have the advantages of high physical strength and good adhesion, but the price is relatively high and would be a burden to patients or consumers. In view of the concerns or problems derived from the aforementioned silver powder and ceramic materials, composite resins are mostly used as the tooth filling materials at present.

The conventional composite resin used for tooth filling includes a photoinitiator/photocuring agent. After the conventional composite resin is matched with a light source of a specific wavelength, a photopolymerization reaction is generated to cause the conventional composite resin to produce a curing reaction, thereby filled or sealed at the defected part of the tooth. The light sources include halogen lamp, xenon lamp, and light-emitting diode (LED) lamp. The halogen lamp needs to be equipped with a filter to generate the light source (blue light) required for photocuring, is easy to cause high temperature during use and needs to be equipped with a cooling fan, and has problems such as short service life. Although the xenon lamp can provide higher brightness than that of the halogen lamp, the structure of the xenon lamp is complicated and the price of the xenon lamp is high. The LED lamp has the advantages of low voltage, low cost, and long life. Therefore, most of the conventional photopolymerization devices used in dentistry use the LED lamps as light sources.

Furthermore, although the conventional photopolymerization devices for dentistry can use an LED lamp to perform a photocuring reaction on the composite resin, the light-emitting diode is not provided with a resonant cavity, so that the light emitted by the LED lamp 60 has a large divergence angle as shown in FIG. 28. That is, the light of the LED lamp 60 will emit with a wide range of illumination on an object, which makes the energy of the LED lamp 60 unable to concentrate, and cannot be precisely irradiated at a position of the tooth 70 that is filled with the composite resin 80. Therefore, with reference to FIG. 29, during the operation of the light-curing reaction through the LED lamp 60, the tooth 70 filled with the composite resin 80 is irradiated, the energy of the light emitted by the LED lamp 60 is low, the entire composite resin 80 cannot be irradiated for photocuring reaction, and only the composite resin 80 located on the outside of the tooth 70 can be photocured. Therefore, when the LED lamp 60 is used as a light source, the penetration is poor during the process of filling the composite resin 80, so only a small amount of filling and multiple irradiations can be performed, which is relatively time-consuming and inconvenient. In addition, the way of filling and irradiating multiple times will also affect the curing effect of the composite resin 80, thereby affecting the treatment effect of the tooth 70.

Additionally, there are many kinds of composite resins 80 currently used as dental filling materials, including TPO (2,4,6-trimethylbenzoyl-diphenylosphine oxide), BAPO (Bisacylphosphine oxide), BP (Benzophenone), CQ (Camphorquinone), PQ (9,10-Phenanthrenequinone), PPD (1-phenyl-1,2propanedione), TMBOPF (9-(2,4,6-trimethylbenzoyl)-9-oxytho-9-phosphafuluorene), TOPF (9-(p-toluyl)-9-oxytho-9-phosphafuluorene), BTMGe (Benzoyltrimethylgermane), DBDEGe (Dibenzoyldiethylgermane), IVO (Ivocerin-dibenzoyl germanium) and P3C-SB ((7-ethoxy-4-methylcumarin-3-yl) phenyliodo-nium) and other photo-initiator chemical materials, and the above-mentioned chemical materials absorb light in different wavelength ranges. Therefore, users often need to select or purchase a dental photopolymerization device with a wavelength corresponding to the chemical material, so that the composite resin 80 can be photopolymerized after irradiation. When the composite resin 80 does not correspond to the light source, the composite resin 80 cannot be cured or the curing is incomplete, thereby affecting the treatment effect of the teeth 70. According to different composite resins 80, the user may purchase or use a corresponding light source, that is, multiple photopolymerization devices need to be purchased, and this will cause cost and burden to users. Therefore, the conventional photopolymerization devices need to be improved.

Furthermore, there is currently a dental equipment using a diode laser (Dental Diode Laser) used in dentistry, which can be used for cutting gums, cauterizing hemostasis, periodontal disease treatment or cleaning artificial roots. Optical fiber is mainly used as a working medium, and the laser is output through the optical fiber. However, when the conventional dental equipment of the diode laser is used, the optical fiber is directly contacted with the treatment place, such as the gum or artificial root. The cost of consumables is increased due to use of the contacting optical fibers, and when the tissue around the artificial root is treated by the optical fibers, it is easy to scratch the surface of the artificial root. The scratched artificial root is not conducive to the attachment of new bone, and it will affect the stability of the artificial tooth root placed on the gum. Furthermore, moisture, heme, and hydroxyapatite (one of the main components of bone) have a high absorption rate for the laser light with a wavelength of 2980 nanometers, which will lead to burn and destroy the surrounding medium that stabilizes the artificial root, and this is not conducive to the setting of the artificial root. In addition, the optical fiber is used as the working medium of the laser light, so that the laser light will be emitted in a divergent type and cannot be focused, resulting in low energy. However, its performance and practicability are limited. Therefore, the conventional dental equipment used by diode lasers also needs to be improved.

To overcome the shortcomings, the present invention tends to provide a laser device for dentistry to mitigate the aforementioned problems.

SUMMARY OF THE INVENTION

The main objective of the invention is to provide a laser device for dentistry that may improve curing effect, may increase practicality, and can be used conveniently.

A laser device for dentistry in accordance with the present invention has a body, a light source group, and a light guiding pipe. The body has an outer casing, an operating module, and a controlling module. The light source group is disposed in the body and has multiple light-emitting elements, a reflector, a collimating lens, and a focusing lens. Each light-emitting element is a laser diode, is disposed at a connecting portion of the body and is electrically connected to the controlling module. The reflector is mounted around the light-emitting elements. The collimating lens is disposed on a side of the reflector away from the light-emitting elements. The focusing lens is disposed on a side of the collimating lens away from the reflector. The light guiding pipe is detachably connected to the connecting portion of the body and is located on a front side of the light source group.

Other objects, advantages and novel features of the invention will become more apparent from the following detailed description when taken in conjunction with the accompanying drawings.

DETAILED DESCRIPTION OF PREFERRED EMBODIMENTS

Figure 1:
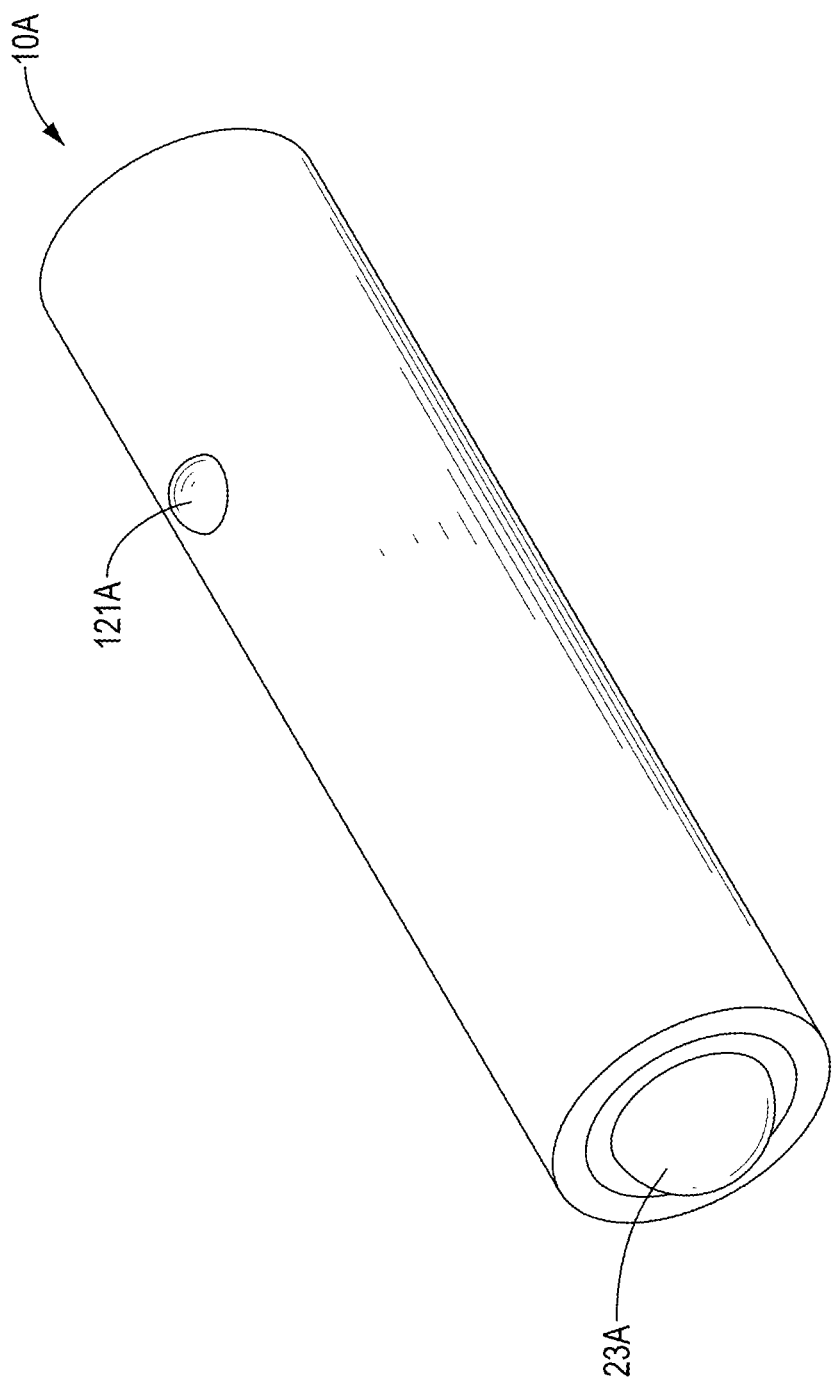
FIG. 1 is a perspective view of a first embodiment of a laser device for dentistry in accordance with the present invention.
Figure 2:
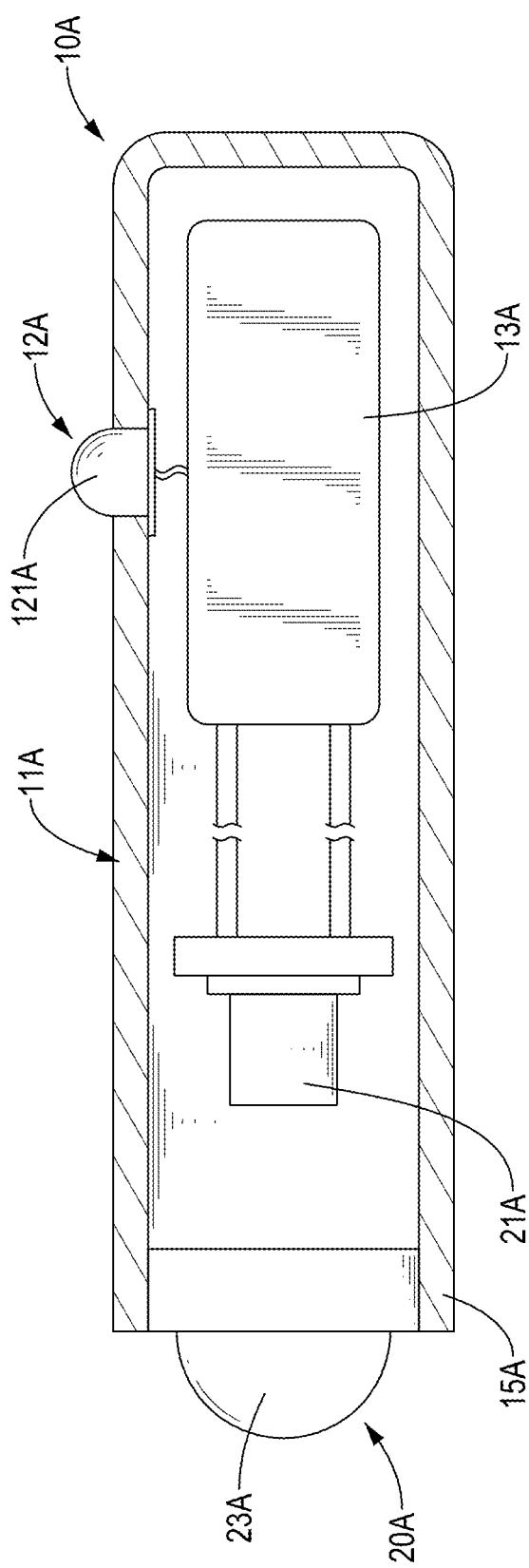
FIG. 2 is a side view in partial section of the laser device for dentistry in FIG. 1.
Figure 3:
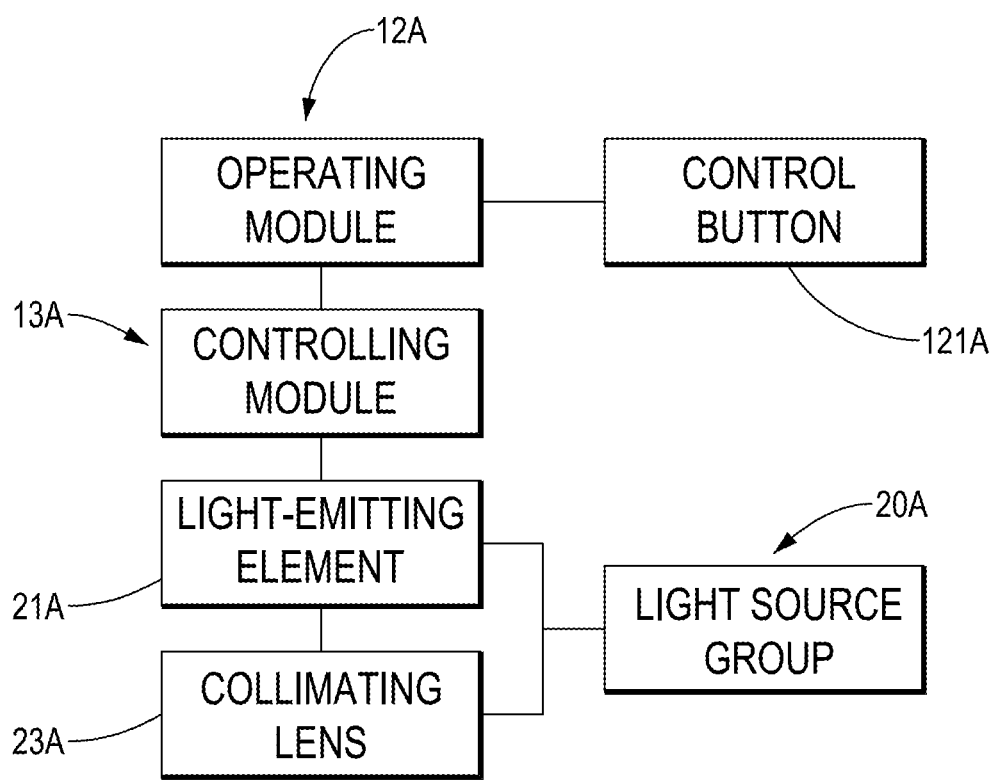
FIG. 3 is a circuit block diagram of the laser device for dentistry in FIG. 1.

With reference to FIGS. 1 to 3, a first embodiment of a laser device for dentistry in accordance with the present invention comprises a body 10A and a light source group 20A.

The body 10A has an outer casing 11A, an operating module 12A, and a controlling module 13A. The outer casing 11A can be held by a user and has a free end and a connecting portion 15A. The connecting portion 15A is disposed on the free end of the outer casing 11A. The operating module 12A is disposed on the outer casing 11A and has a control button 121A. With reference to FIG. 3, the controlling module 13A is disposed in the outer casing 11A and is electrically connected to the operating module 12A. Then the operating module 12A can control the light source group 20A via the controlling module 13A. The detailed structures and operating principles of the operating module 12A and the controlling module 13A are conventional and are not to be described in detail.

The light source group 20A is disposed in the body 10A and has at least one light-emitting element 21A and a collimating lens 23A. Each one of the at least one light-emitting element 21A is disposed in the outer casing 11A, is electrically connected to the controlling module 13A, and can be a laser diode (LD). Laser diode (LD) has the advantages of small divergence angle, light source concentration (high optical density), small distance attenuation, and coherence. Preferably, the at least one light-emitting element 21A may be an edge emitting laser diode (EELD) or a surface emitting laser diode (SELD). In addition, in the present invention, the light-emitting element 21A may be a stack laser diode, and the stack laser diode has effects of single with multi-wavelength or single with single wavelength to increase the intensity. Furthermore, the at least one light-emitting element 21A can also select a corresponding multi-wavelength light source with the development of technology. Preferably, the light source used in the present invention can also use a laser with a corresponding wavelength as the light source along with the development of dental polymer materials. The collimating lens 23A is disposed at the connecting portion 15A of the outer casing 11A, and is used to form a parallel light or focus the light emitted by the at least one light-emitting element 21A at a specific focus.

With reference to FIGS. 1 to 3, in the first embodiment of the laser device for dentistry of the present invention, since the at least one light-emitting element 21A is a laser diode, it has physical characteristics such as small divergence angle, concentrated light source (high optical density), and small distance attenuation, so it can be applied to jewelry identification (whether there are cracks or other fillers), medical treatment equipment disinfection, nail painting (cured pigment) and other fields. Multiple sets of the laser devices for dentistry can be used with a box, a space for disinfection is formed in the box, and then it can be used in kitchen tableware or disinfection and sterilization of surgical equipment. In addition, the body 10A is portable due to its small size, and can be used by users as hand disinfection, so that the laser device for dentistry of the present invention has a wide range of applications.

With reference to FIGS. 4 to 8, in a second embodiment of a laser device for dentistry in accordance with present invention, the laser device for dentistry has a body 10B, a light source group 20B, and a light guiding pipe 30B.

The body 10B has an outer casing 11B, an operating module 12B, a controlling module 13B, and a shading plate 14B. The outer casing 11B can be held by a user and has a free end and a connecting portion 15B. The connecting portion 15B is disposed on the free end of the outer casing 11B and has a concave mirror 151B formed in the connecting portion 15B. Preferably, the outer casing 11B is formed by two half shells connected to each other. The operating module 12B is disposed on the outer casing 11B and has multiple control buttons 121B and a display 122B. The control buttons 121B and the display 122B are disposed on the outer casing 11B. The controlling module 13B is disposed in the outer casing 11B and is electrically connected to the operating module 12B, and the operating module 12B can control the light source group 20B via the controlling module 13B. The detailed structures and operating principles of the operating module 12B and the controlling module 13B are conventional and are not to be described in detail. The shading plate 14B is disposed on the connecting portion 15B of the outer casing 11B to provide an effect of shielding the light source, preventing the light of the light source group 20B from damaging the user's eyes.

Figure 5:
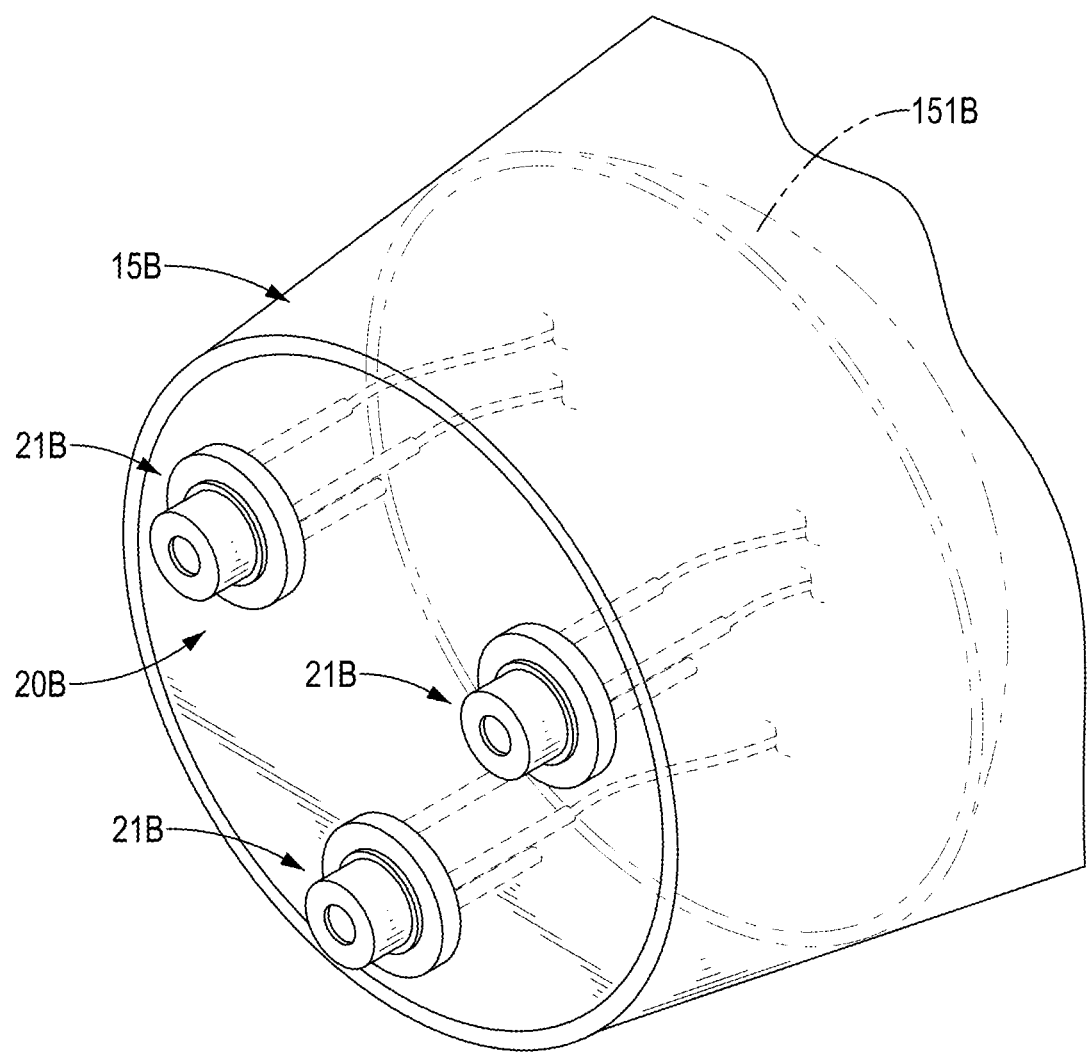
FIG. 5 is an enlarged perspective view of the laser device for dentistry in FIG. 4.
Figure 6:
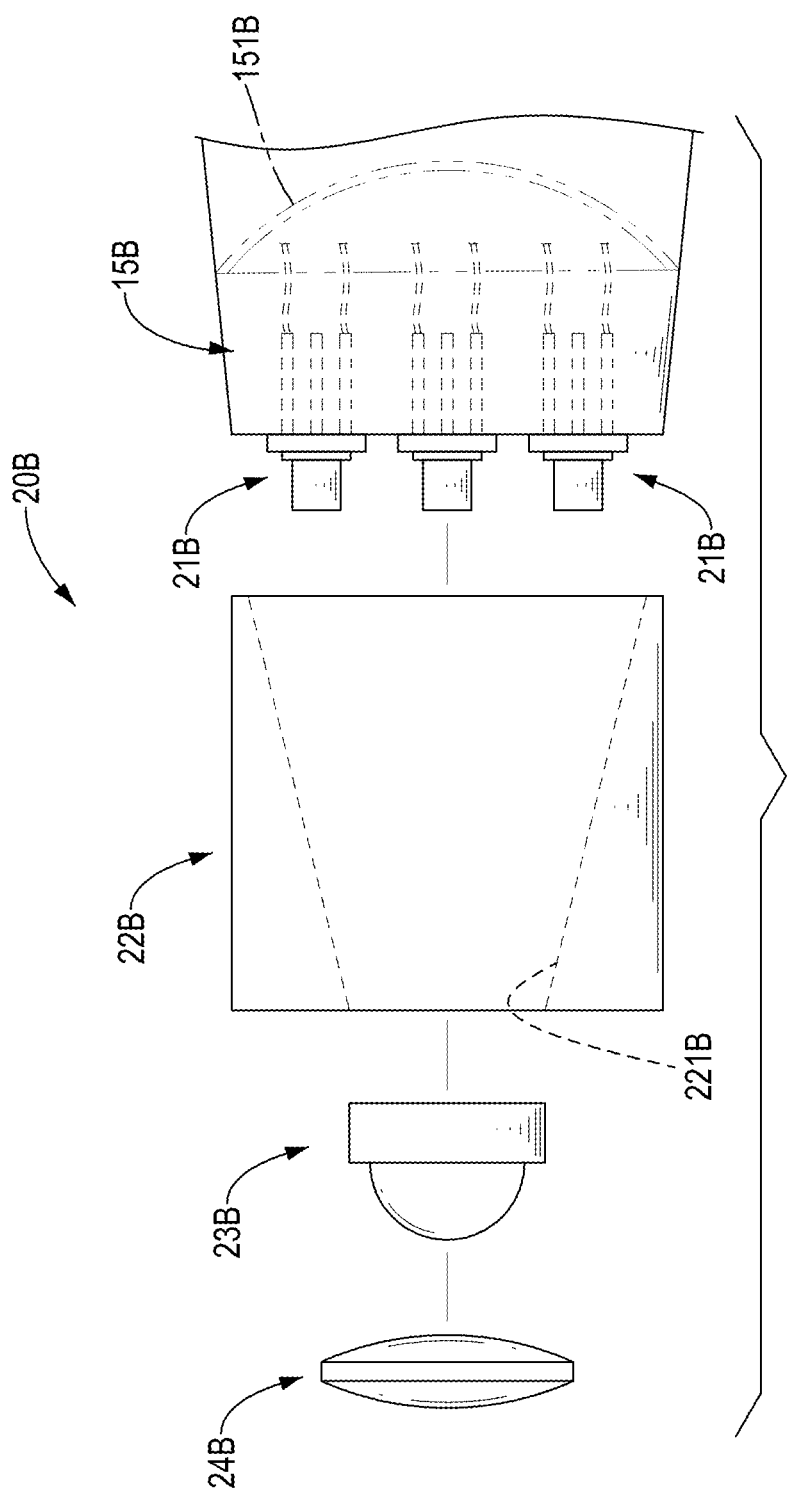
FIG. 6 is an enlarged exploded side view of a light source group of the laser device for dentistry in FIG. 4.
Figure 8:
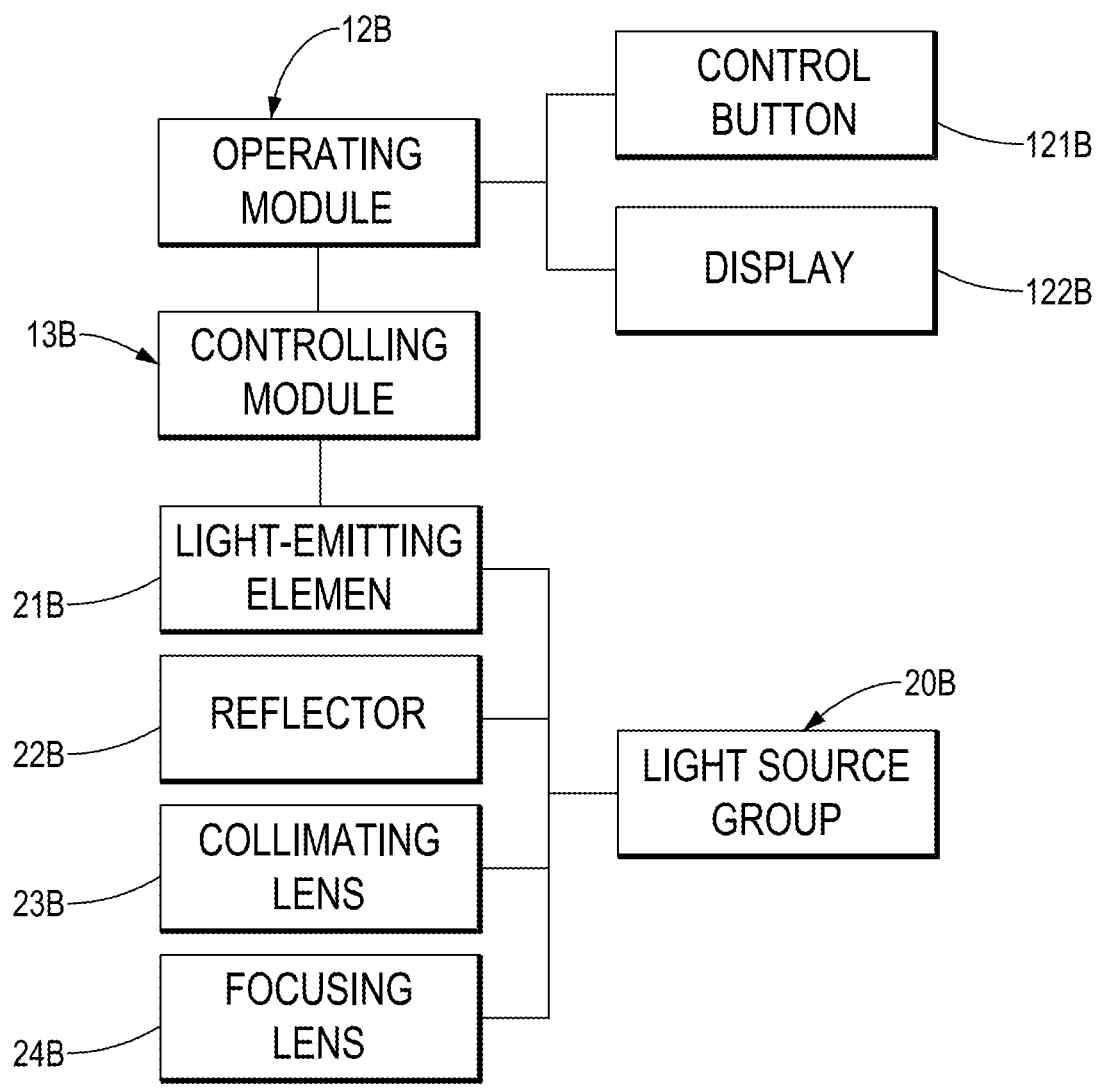
FIG. 8 is a circuit block diagram of the laser device for dentistry in FIG. 4.

With reference to FIGS. 5, 6, and 8, the light source group 20B is disposed in the body 10B and has multiple light-emitting elements 21B, a reflector 22B, a collimating lens 23B, and a focusing lens 24B. Each light-emitting element 21B is disposed at the connecting portion 15B of the outer casing 11B and is electrically connected to the controlling module 13B. The concave mirror 151B of the connecting portion 15B is disposed behind the multiple light-emitting elements 21B. Furthermore, each light-emitting element 21B is a laser diode (LD), and the laser diode has the advantages of small divergence angle, light source concentration (high optical density), small distance attenuation, and coherence. Preferably, each light-emitting element 21B may be an edge emitting laser diode (EELD) or a surface emitting laser diode (SELD). In addition, in the present invention, the light-emitting element 21B may be a stack laser diode, and the stack laser diode has effects of single with multi-wavelength or single with single wavelength to increase the intensity. Furthermore, the light-emitting element 21B of the present invention can also select a corresponding multi-wavelength light source with the development of technology. Preferably, with reference to FIG. 5, the light source group 20B has three laser diodes disposed on the connecting portion 15B at spaced intervals, the wavelengths of the three laser diodes are 405 nanometers (nm), 455 nm, and 488 nm, respectively. The operating module 12B of the body 10B can control the three laser diodes via the controlling module 13B to make the three laser diodes emit light simultaneously or individually or control two of them. Preferably, the light source used in the present invention can also use a laser with a corresponding wavelength as the light source along with the development of dental polymer materials. The light-emitting elements 21B of the light source group 20B of the laser device are three laser diodes with three primary colors, respectively. The light source group 20B can respectively generate light of three primary colors (red, green, and blue; RGB) after being activated, and the laser device emits white light or mixes laser light with other wavelengths.

With reference to FIG. 6, the reflector 22B is disposed on the connecting portion 15B of the outer casing 11B, covers the multiple light-emitting elements 21B and has a reflecting surface 221B tapered outward from the multiple light-emitting elements 21B. Preferably, each of the reflector 22B and the concave mirror 151B is a total reflection mirror. The light sources emitted by the multiple light-emitting elements 21B are reflected by the reflecting surface 221B and the concave mirror 151B and then exit the reflector 22B. The collimating lens 23B is disposed on a side of the reflector 22B away from the multiple light-emitting elements 21B to form a parallel beam or focus the light beam reflected by the reflector 22B at a specific focus. The focusing lens 24B is disposed on a side of the collimating lens 23B away from the reflector 22B to focus the parallel beam formed by the collimating lens 23 into a single spot as shown in FIG. 9.

Figure 7:
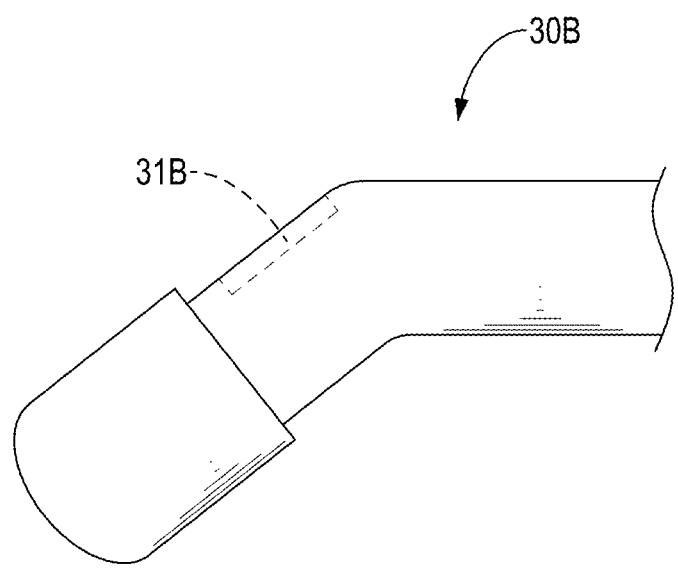
FIG. 7 is an enlarged side view of a light guiding pipe of the laser device for dentistry in FIG. 4.

With reference to FIG. 7, the light guiding pipe 30B is detachably connected to the connecting portion 15B of the body 10B and is located on a front side of the light source group 20B for guiding the light of the light source group 20B out of the laser device for dentistry. The light guiding pipe 30B has a reflecting mirror 31B disposed in the light guiding pipe 30B, the reflecting mirror 31B is used to change the single light spot formed by the light source group 20B, so that it can be emitted out of the laser device for dentistry via the light guiding pipe 30B. Furthermore, the light guiding pipe 30B can also be an optical fiber pipe without disposing the reflecting mirror 31B.

Figure 4:
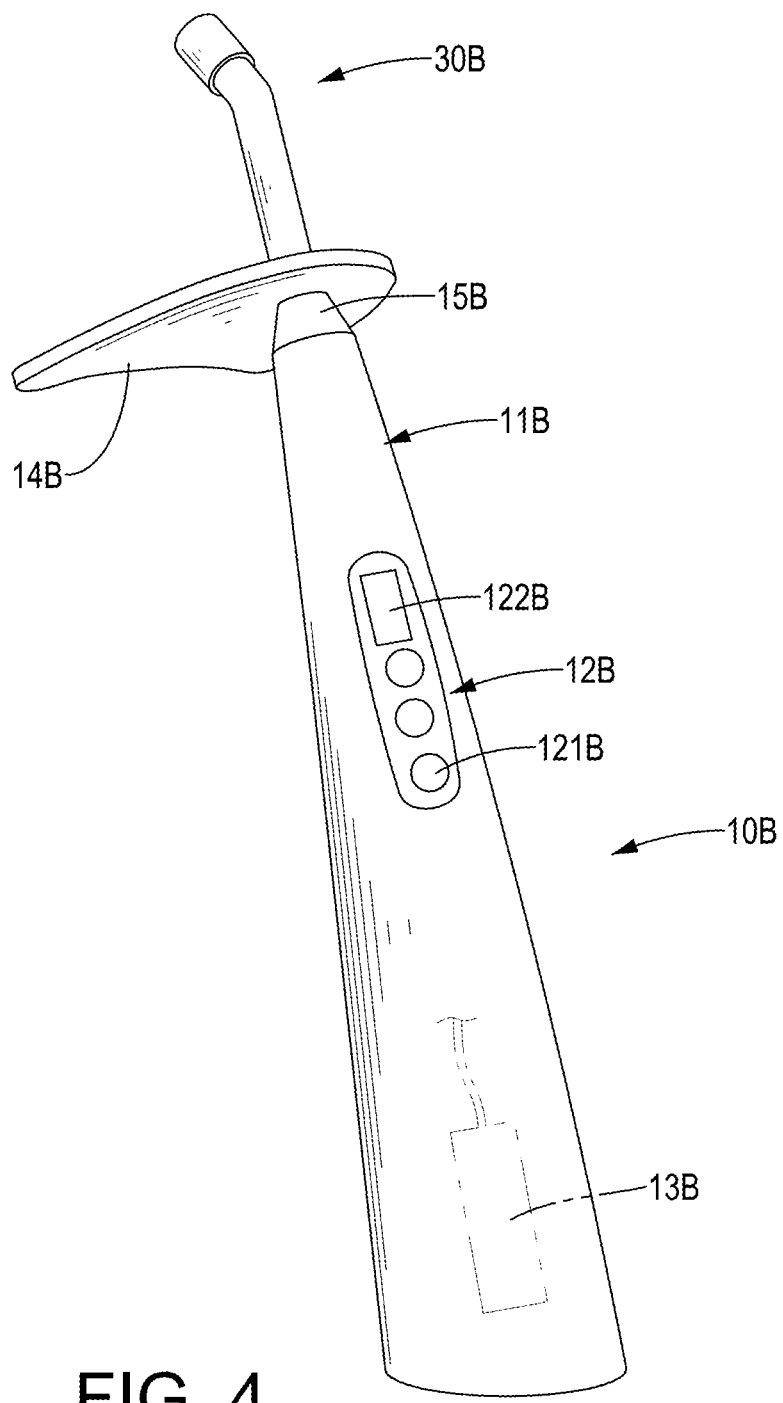
FIG. 4 is a perspective view of a second embodiment of a laser device for dentistry in accordance with the present invention.
Figure 9:
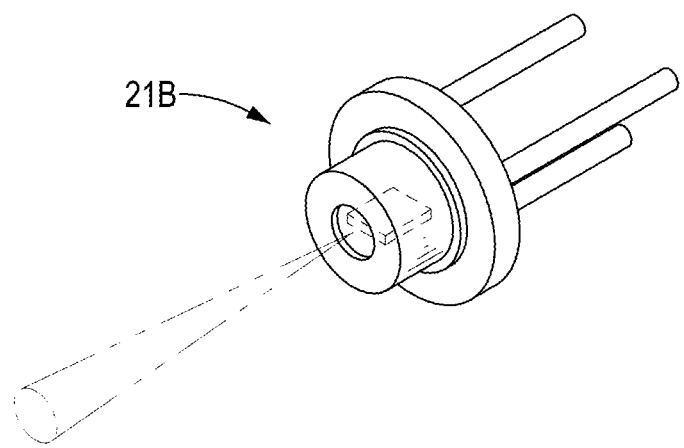
FIG. 9 is an operational perspective view of the light source group of the laser device for dentistry in FIG. 4.
Figure 10:
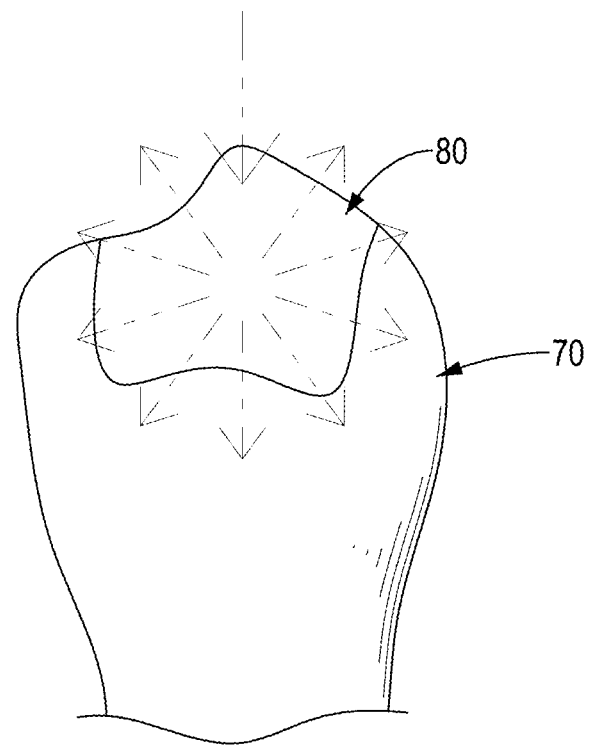
FIG. 10 is an operational side view of the light source group of the laser device in FIG. 4 for dentistry for curing materials in a tooth.
Figure 11:
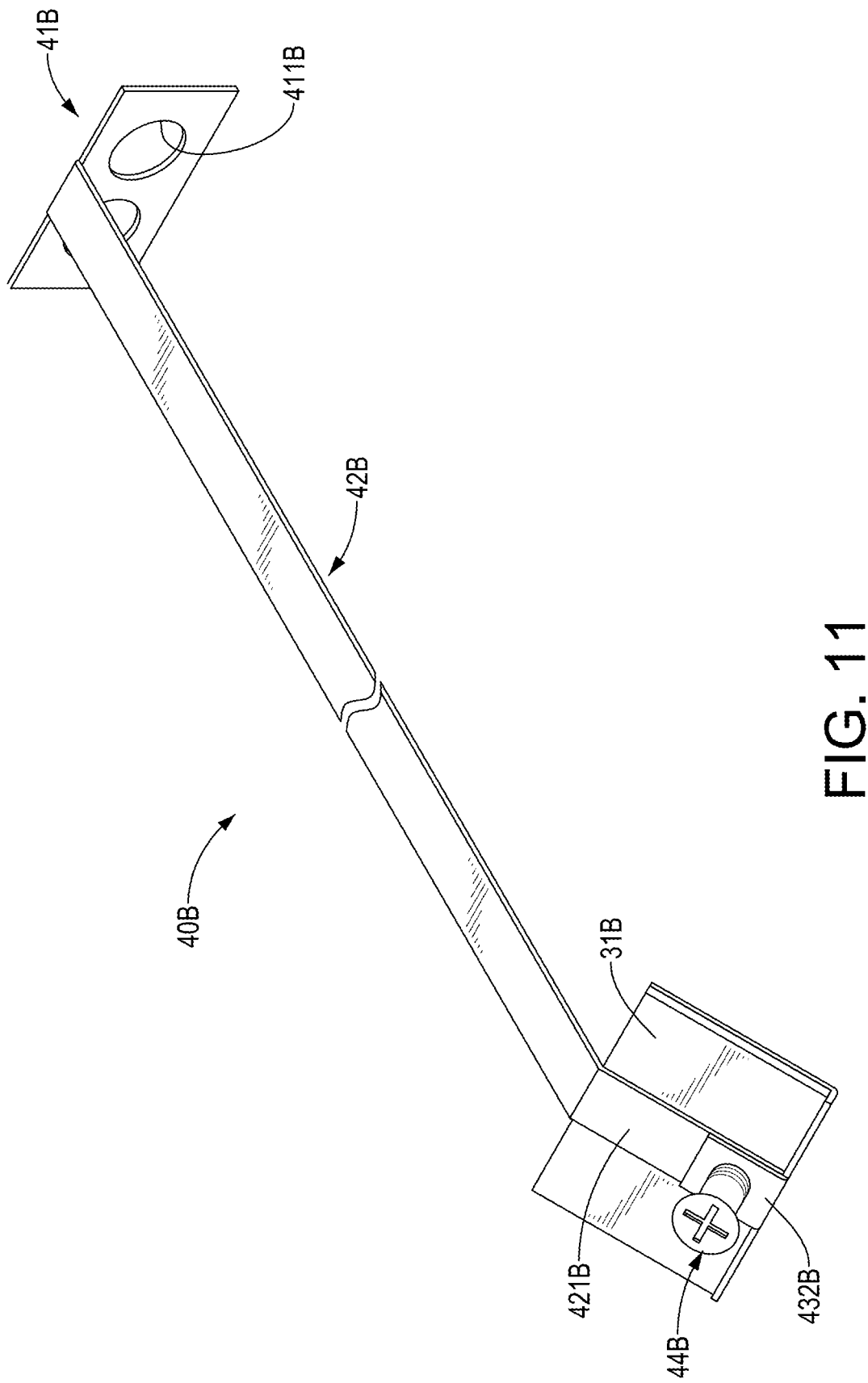
FIG. 11 is a perspective view of a holding group of the laser device for dentistry in FIG. 4.
Figure 12:
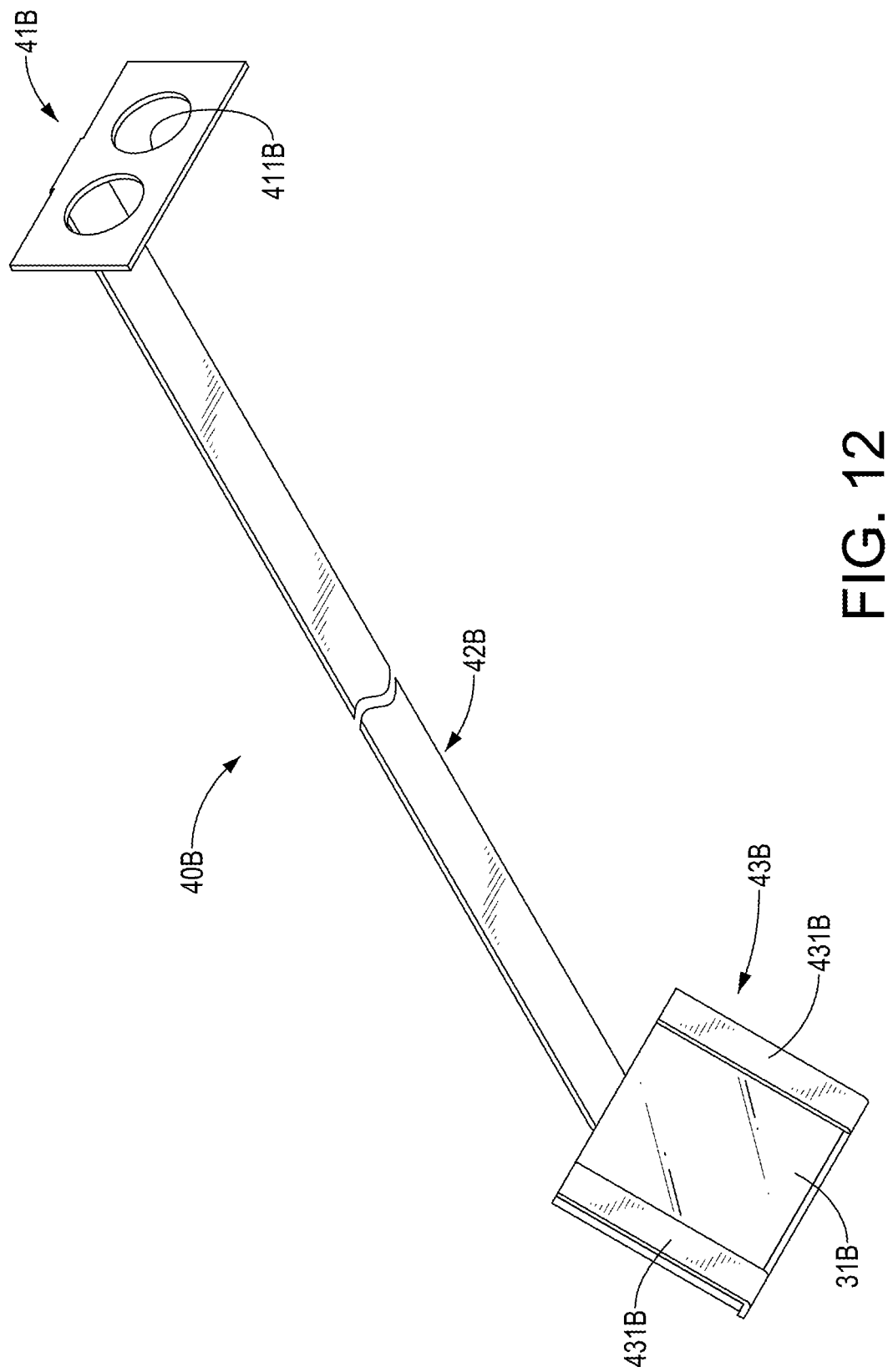
FIG. 12 is another perspective view of the holding group of the laser device for dentistry in FIG. 4.
Figure 13:
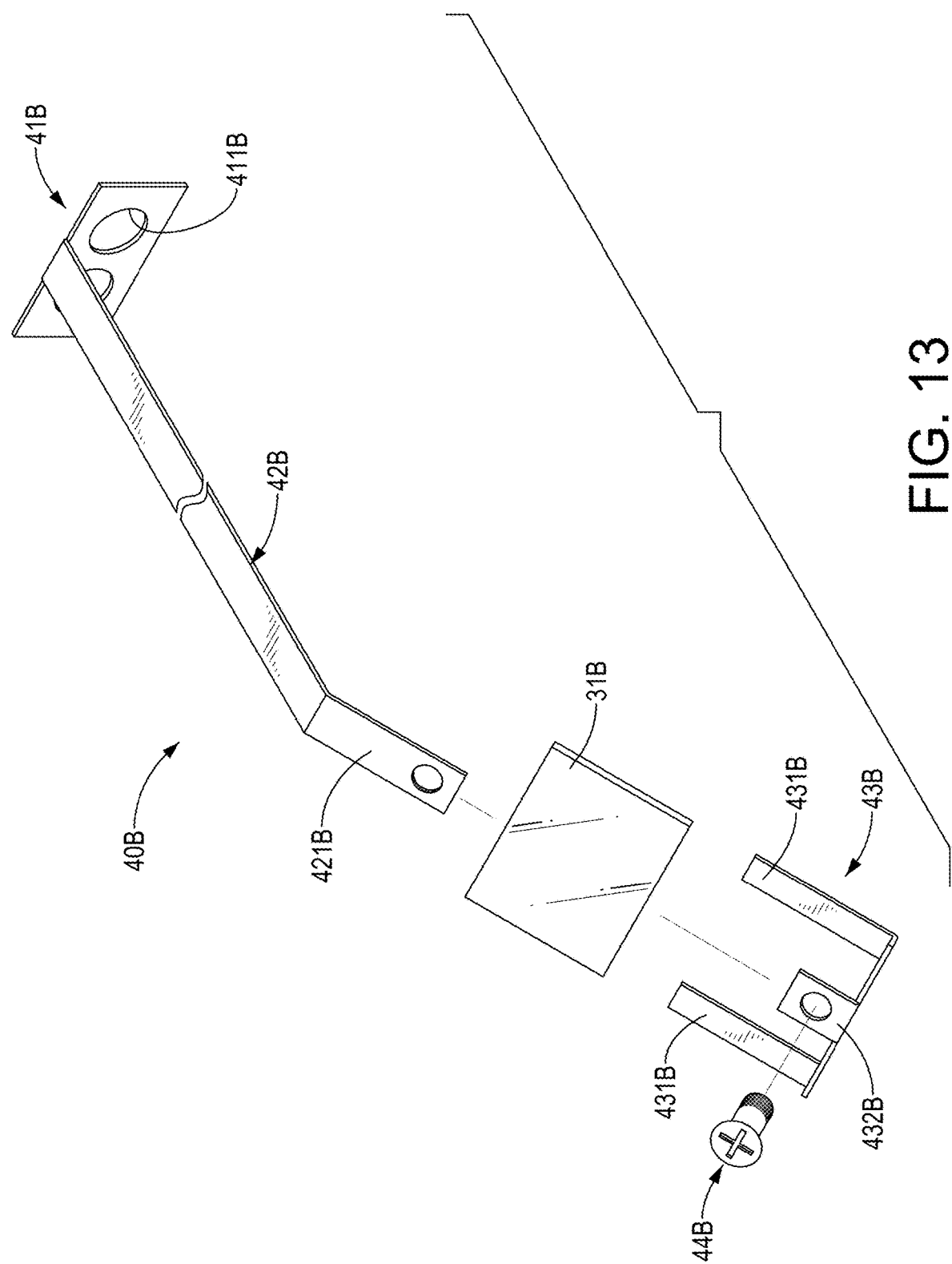
FIG. 13 is an exploded perspective view of the holding group of the laser device for dentistry in FIG. 4.
Figure 14:
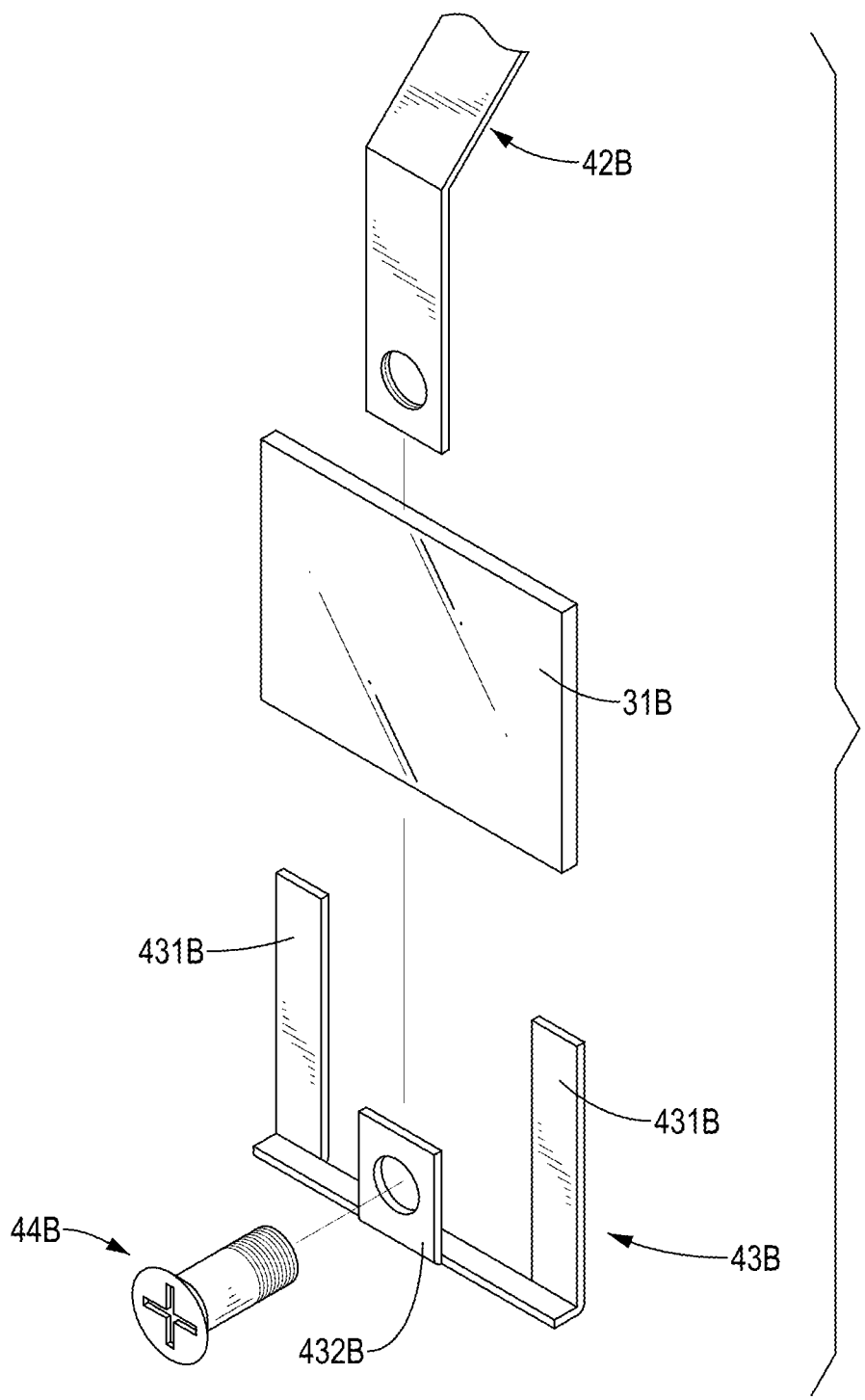
FIG. 14 is an enlarged and exploded perspective view of the holding group of the laser device for dentistry in FIG. 4.

With reference to FIGS. 4 and 8, when the laser device for dentistry of the present invention is in use, a user presses one of the control buttons 121B of the operating module 12B, the light-emitting elements 21B of the light source group 20B are driven to emit lights via the controlling module 13B as shown in FIG. 9. The light-emitting elements 21B can emit lights at the same time or individually by pressing the control buttons 121B. After the light-emitting elements 21B emit lights, the lights are reflected by the reflector 22B and the concave mirror 151B as shown in FIG. 6 and emitted to the collimating lens 23B to form a parallel beam, and the parallel beam is focused by the focusing lens 24B to form a single light spot. With reference to FIG. 7, the single light spot is emitted toward the reflecting mirror 31B of the light guiding pipe 30B, and after being reflected by the reflecting mirror 31B, the single light spot is emitted out of the laser device for dentistry. The concave mirror 151B can reflect part of the lights reflected back to the connecting portion 15B by the reflector 22B to the reflector 22B again and then exit the collimating lens 23B. With reference to FIG. 10, the single light spot is irradiated on a composite resin 80 filled in a tooth 70, since the light emitted by the light source group 20B has high penetrability, collimation, and coherence and the light can irradiate into the composite resin 80 filled in the tooth 70. Then photopolymerization is performed on the entire composite resin 80, so that the entire composite resin 80 can be photocured, which is relatively convenient in operation, saves time, and can improve the tightness of tooth filling. Furthermore, with reference to FIG. 5, in the second embodiment of the laser device for dentistry of the present invention, there are three light-emitting elements 21B with three different wavelengths disposed on the connecting portion 15B of the body 10B. When the composite resin 80 of different chemical materials is used, the light sources of corresponding wavelengths can be provided by the light-emitting elements 21B of different wavelengths. Then the composite resin 80 of different chemical materials can be photocured through a single laser device for dentistry, and there is no need to purchase additional laser devices for dentistry, which can greatly reduce the cost for use. The application range of the laser device for dentistry can be increased, and the composite resin 80 of different chemical materials can be accurately cured by light, which can effectively avoid the phenomenon of inability to cure or incomplete curing, and relatively improve the treatment quality of tooth filling. The present invention can provide a laser device for dentistry with improved curing effect and increased practicality and is convenient in use.

With reference to FIGS. 11 to 14, the laser device for dentistry of the second embodiment of the present invention further has a holding group 40B. The holding group 40B is disposed in the light guiding pipe 30B for holding the reflecting mirror 31B securely in the light guiding pipe 30B. The holding group 40B has a fixing panel 41B, a supporting arm 42B, and a supporting frame 43B. The fixing panel 41B is securely connected to the connecting portion 15B of the outer casing 11B, has a cross section corresponding to a cross section of the connecting portion 15B, and may be circular or square in shape. The fixing panel 41B has multiple through holes 411B formed therethrough and corresponding to the multiple light-emitting elements 21B of the light source group 20B. Then the light of the light-emitting elements 21B can be emitted toward the reflector 22B through the corresponding through holes 411B. An end of the supporting arm 42B is connected to the fixing panel 41B and extends along the light guiding pipe 30B. In addition, the supporting arm 42B has a connecting segment 421B formed on an end thereof opposite to the fixing panel 41B.

The supporting frame 43B is connected to the connecting segment 421B of the supporting arm 42B and is disposed in the light guiding pipe 30B, and the supporting frame 43B and the fixing panel 41B are respectively disposed on two ends of the supporting arm 42B. The supporting frame 43B has two holding tabs 431B and a linking tab 432B. The two holding tabs 431B are respectively disposed on two sides of the supporting frame 43B at a spaced interval. The linking tab 432B is disposed on a middle of the supporting frame 43B between the two holding tabs 431B to form a holding space between the two holding tabs 431B and the linking tab 432B. The connecting segment 421B of the supporting arm 42B is connected to the linking tab 432B of the supporting frame 43B. The reflecting mirror 31B is mounted in the holding space of the supporting frame 43B. Furthermore, the holding group 40B has a fastener 44B connected to the linking tab 432B and the connecting segment 421B and abuts against the reflecting mirror 31B to securely hold the reflecting mirror 31B on the supporting frame 43B. The reflecting mirror 31B can be disposed in the light guiding pipe 30B conveniently and quickly by disposing the holding group 40B in the light guiding pipe 30B to reflect the light emitted by the light source group 20B out of the laser device for dentistry.

Figure 15:
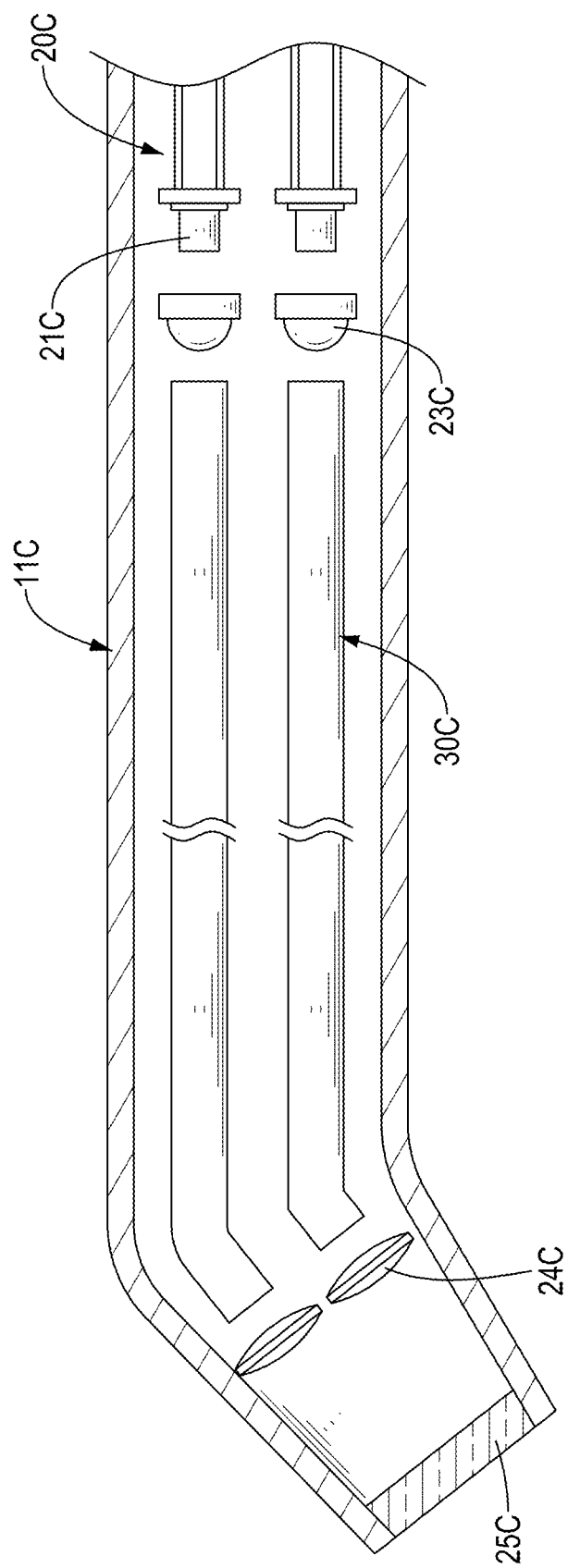
FIG. 15 is an enlarged side view in partial section of a third embodiment of a laser device for dentistry in accordance with the present invention.

With reference to FIG. 15, a third embodiment of a laser device for dentistry in accordance with the present invention is substantially the same as the second embodiment as shown in FIGS. 4 to 7 except for the following features. In the third embodiment of the present invention, the light source group 20C has multiple light-emitting elements 21C, multiple collimating lenses 23C, multiple focusing lenses 24C, and a protective mirror 25C. Each one of the light-emitting elements 21C is disposed in the outer casing 11C, is a laser diode, and the wavelengths of the light-emitting elements 21C can be the same or different. Each one of the collimating lenses 23C is disposed in the outer casing 11C and aligns with one of the light-emitting elements 21C. Each one of the focusing lenses 24C is disposed on a side of one of the collimating lenses 23C away from the corresponding light-emitting element 21C. The protective mirror 25C is disposed on the outer casing 11C and is disposed on a side of each one of the focusing lenses 24C away from the light-emitting elements 21C. Furthermore, the laser device for dentistry has multiple light guiding pipes 30C, each one of the light guiding pipes 30C is disposed in the outer casing 11C between one of the collimating lenses 23C and the corresponding focusing lens 24C of the light source group 20C to guide the light emitted by the light source group 20C out of the laser device for dentistry. The spatial and structural relationships between the light-emitting elements 21C, the collimating lenses 23C, the focusing lenses 24C of the light source group 20C, and the light guiding pipes 30C are one-to-one.

Figure 16:
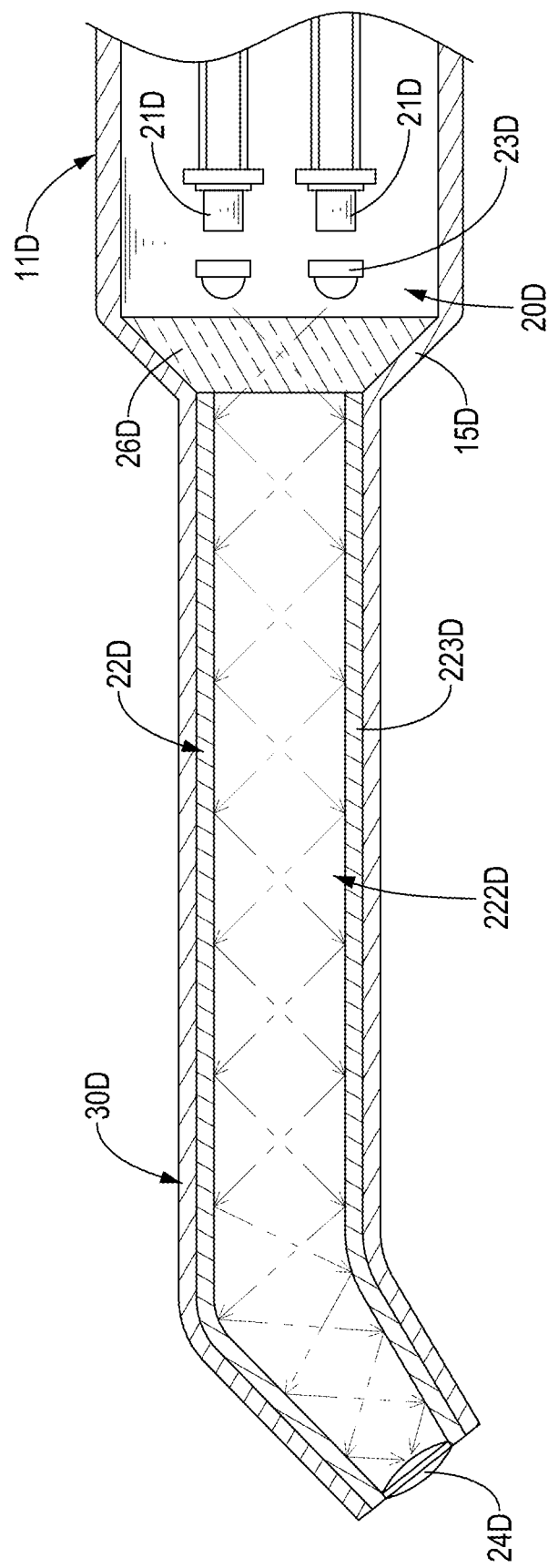
FIG. 16 is an enlarged side view in partial section of a fourth embodiment of a laser device for dentistry in accordance with the present invention.

With reference to FIG. 16, a fourth embodiment of a laser device for dentistry in accordance with the present invention is substantially the same as the second embodiment as shown in FIGS. 4 to 7 except for the following features. In the fourth embodiment of the present invention, the light source group 20D has multiple light-emitting elements 21D, multiple collimating lenses 23D, a light-gathering cup 26D, a focusing lens 24D, and a reflector 22D. Each one of the light-emitting elements 21D is disposed in the connecting porting 15D of the outer casing 11D, is a laser diode, and the wavelengths of the light-emitting elements 21D can be the same or different. Each one of the collimating lenses 23D is disposed in the outer casing 11D and aligns with one of the light-emitting elements 21D. The light-gathering cup 26D is disposed at the connecting portion 15D of the outer casing 11D to collect the light emitted by each one of the light-emitting elements 21D through the corresponding collimating lens 23D. The focusing lens 24D is disposed on the outer casing 11D, and is disposed on a side of the light-gathering cup 26D away from the collimating lenses 23D. The reflector 22D is disposed in the outer casing 11D between the light-gathering cup 26D and the focusing lens 24D and has two mediums with different refractive indices. The light emitted through the light-gathering cup 26D is totally reflected between the two mediums (Total Internal Reflection), and then emitted through the focusing lens 24D after the total internal reflection. Preferably, the reflector 22D has an inner optically denser medium 222D and an outer optically thinner medium 223D. The light guiding pipe 30D is connected to the connecting portion 15D of the outer casing 11D and is located outside the reflector 22D of the light source group 20D to guide the light emitted by the light source group 20D out of the laser device for dentistry. The spatial and structural relationships between the light-emitting elements 21D and the collimating lenses 23D of the light source group 20D and the light guiding pipe 30D are multi-to-one.

Figure 17:
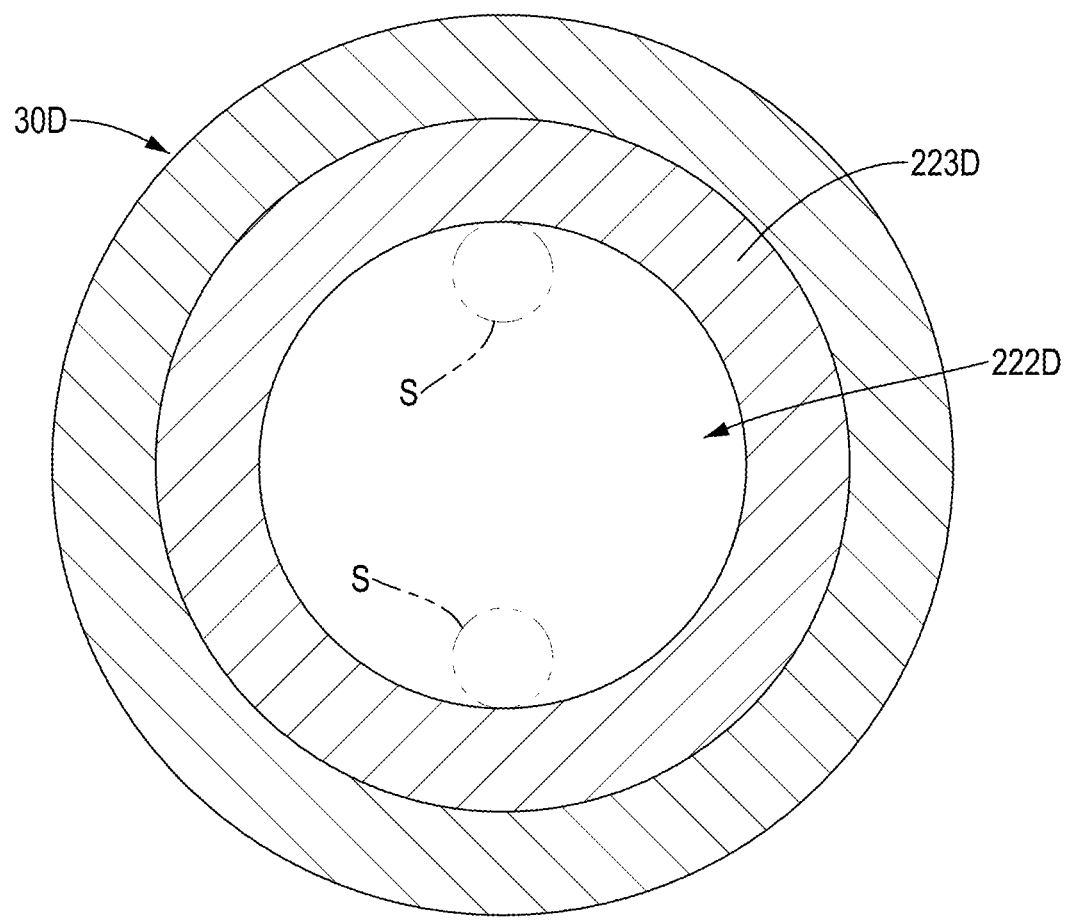
FIG. 17 is an operational side view of the laser device for dentistry in FIG. 16.
Figure 18:
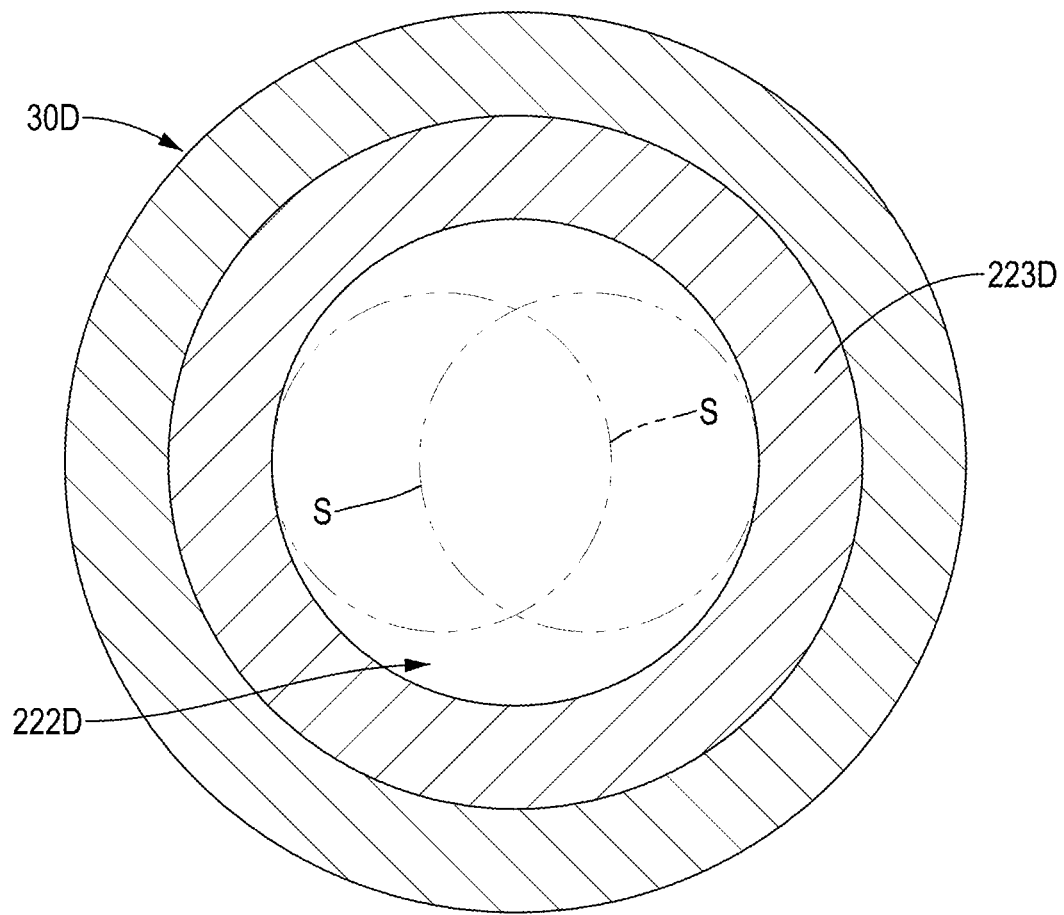
FIG. 18 is another operational side view of the laser device for dentistry in FIG. 16.

With reference to FIG. 16, when the fourth embodiment of the laser device for dentistry in accordance with the present invention is in use, the light of each one of the light-emitting elements 21D of the light source group 20D emits to the light-gathering cup 26D via the corresponding collimating lens 23D and totally reflects between the two mediums 222D, 223D of the reflector 22D, and then is focused by the focusing lens 24D and exits the light guiding pipe 30D. If each one of the light-emitting elements 21D is emitted through the reflector 22D and the focusing lens 24D, a light spot S is formed as shown in FIG. 17 and is too small to be overlapped, and the light will not be concentrated and will be scattered. Therefore, the fourth embodiment of the laser device for dentistry of the present invention is configured according to the relationship between the wavelength of light of each light-emitting element 21D and the refractive index of light of the reflector 22D, so that the light spots S formed by the light-emitting element 21D via the focusing lens 24D can be overlapped without shuffling as shown in FIG. 18.

Figure 19:
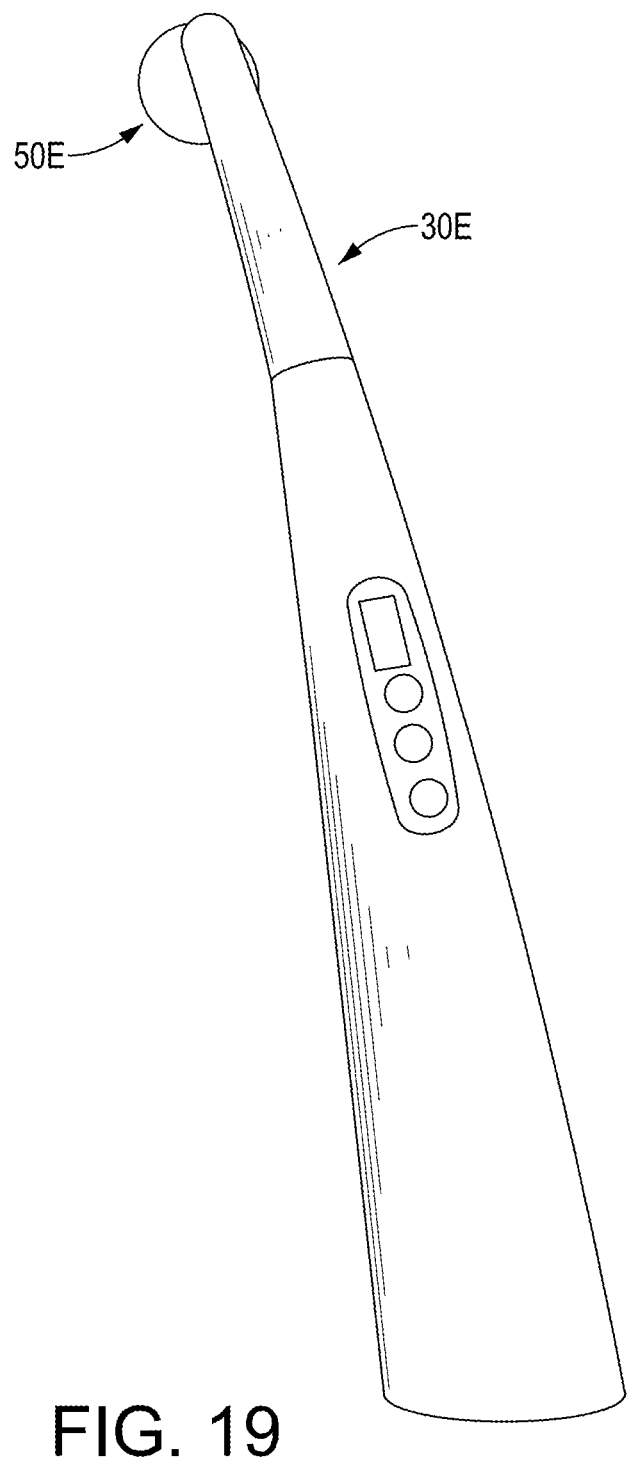
FIG. 19 is a perspective view of a fifth embodiment of a laser device for dentistry in accordance with the present invention.
Figure 20:
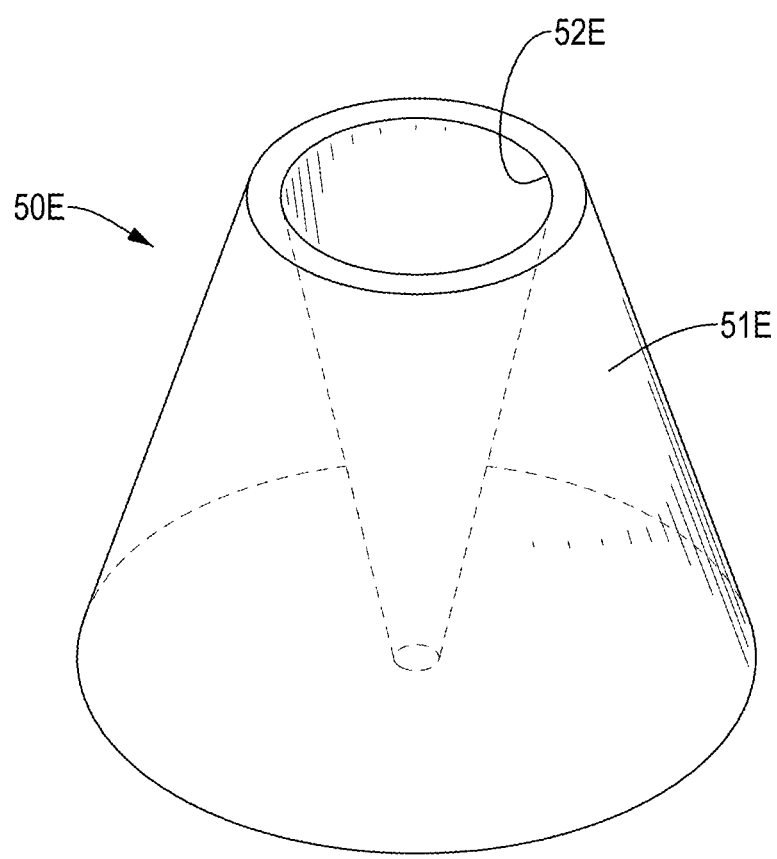
FIG. 20 is an enlarged perspective view of the laser device for dentistry in FIG. 19.
Figure 21:
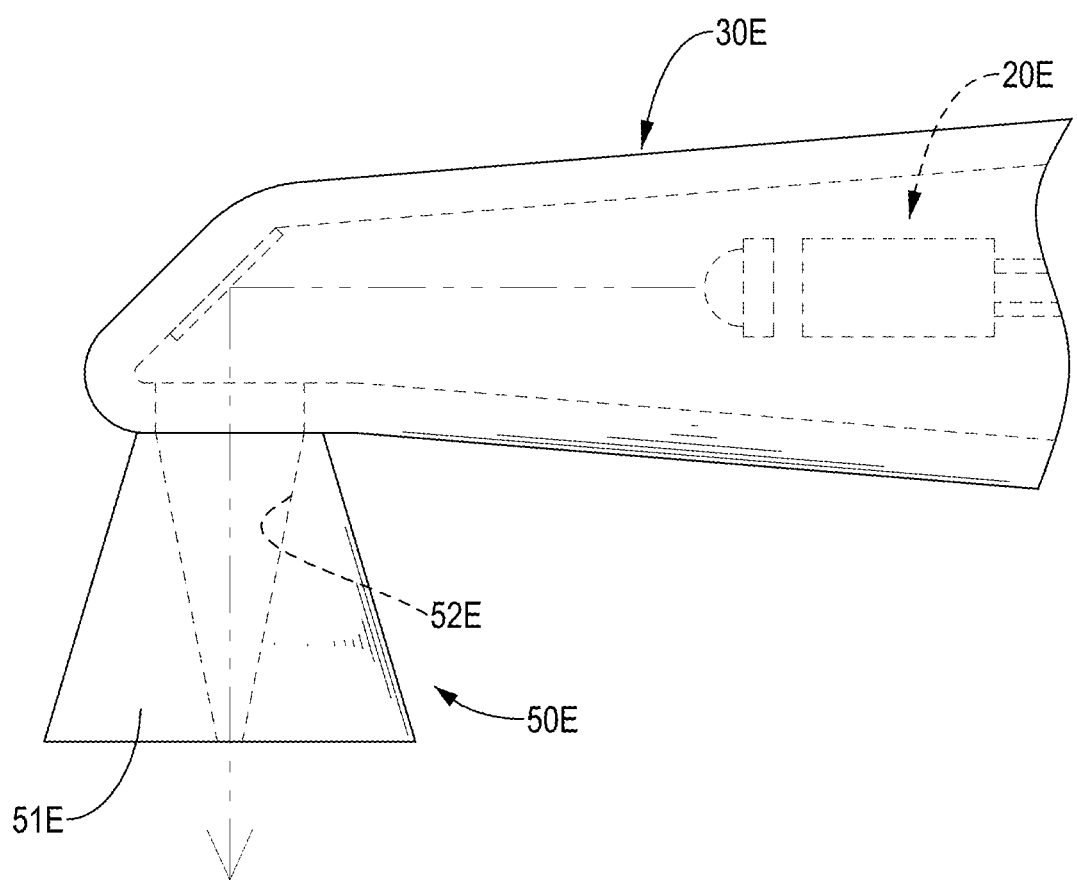
FIG. 21 is an operational side view of the laser device for dentistry in FIG. 19.

With reference to FIGS. 19 and 20, a fifth embodiment of a laser device for dentistry in accordance with the present invention is substantially the same as the second embodiment as shown in FIGS. 4 to 7 except for the following features. In the fifth embodiment of the present invention, the laser device for dentistry further has a filter cover 50E. The filter cover 50E is connected to the light guiding pipe 30E to filter the light emitted by the laser device for dentistry to avoid affecting the user. The filter cover 50E can be connected to the light guiding pipe 30E by means of threads, sockets or tight fitting. The filter cover 50E has an outer cover portion 51E and an inner guide portion 52E. The outer cover portion 51E is a conical body that gradually expands outward from the light guiding pipe 30E, and the inner guide portion 52E is integrally formed or detachably disposed in the outer cover portion 51E. Furthermore, the inner guide portion 52E is a light guide channel formed in the outer cover portion 51E and is tapered outward from the light guiding pipe 30E. So the light emitted by the light source group 20E can be guided via the inner guide portion 52E as shown in FIG. 21 out of the laser device for dentistry, and can be filtered by the outer cover portion 51E to provide an effect of protecting the eyes of the user.

Figure 22:
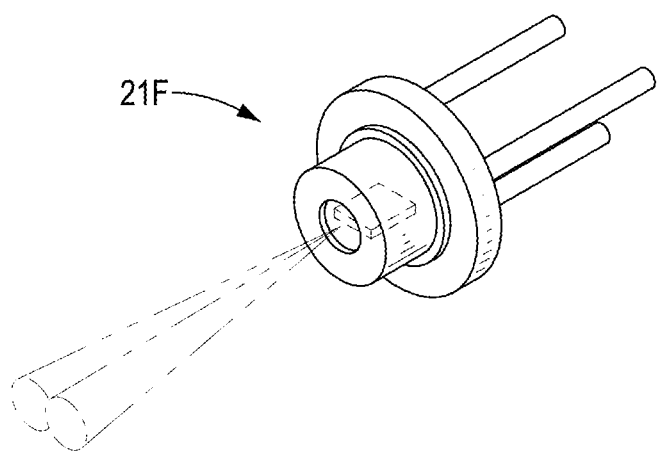
FIG. 22 is an operational perspective view of a sixth embodiment of a light source group of a laser device for dentistry in accordance with the present invention.
Figure 23:
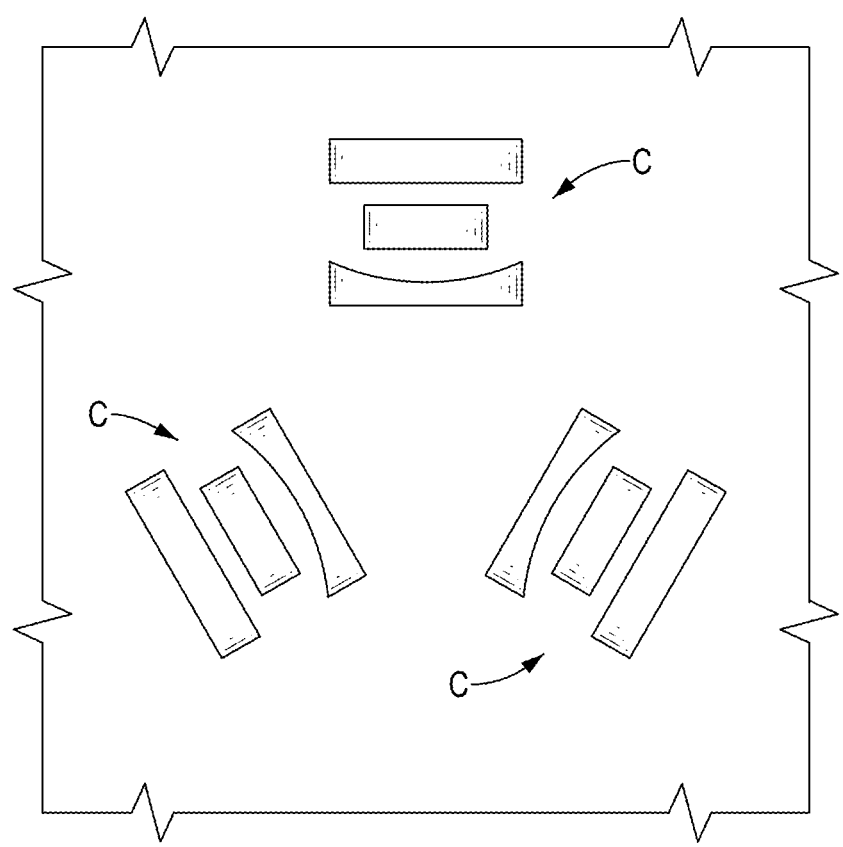
FIG. 23 is a top side view of the light source group of the laser device for dentistry in FIG. 22.

With reference to FIG. 22, a sixth embodiment of a laser device for dentistry in accordance with the present invention is substantially the same as the second embodiment as shown in FIGS. 4 to 7 except for the following features. In the fifth embodiment of the present invention, each light-emitting element 21F is an edge emitting laser diode (EELD) with multiple lights, so that each light-emitting element 21F can simultaneously emit multiple lights of different or the same wavelength. With reference to FIG. 23, multiple resonant cavities C are formed on a semiconductor substrate through a semiconductor manufacturing process. After excitation, the resonant cavities C can generate lights of the same wavelength (synchronous) or different wavelengths (asynchronous), so that the lights can have the effect of increasing intensity or additive. For example, each one of the light-emitting elements 21F has three resonant cavities C, and the three resonant cavities C can respectively generate three primary colors of lights (red, green and blue; RGB) after being excited. After the addition of the three primary colors of lights, the light-emitting element 21F emits a white light or laser light of other wavelengths.

Figure 24:
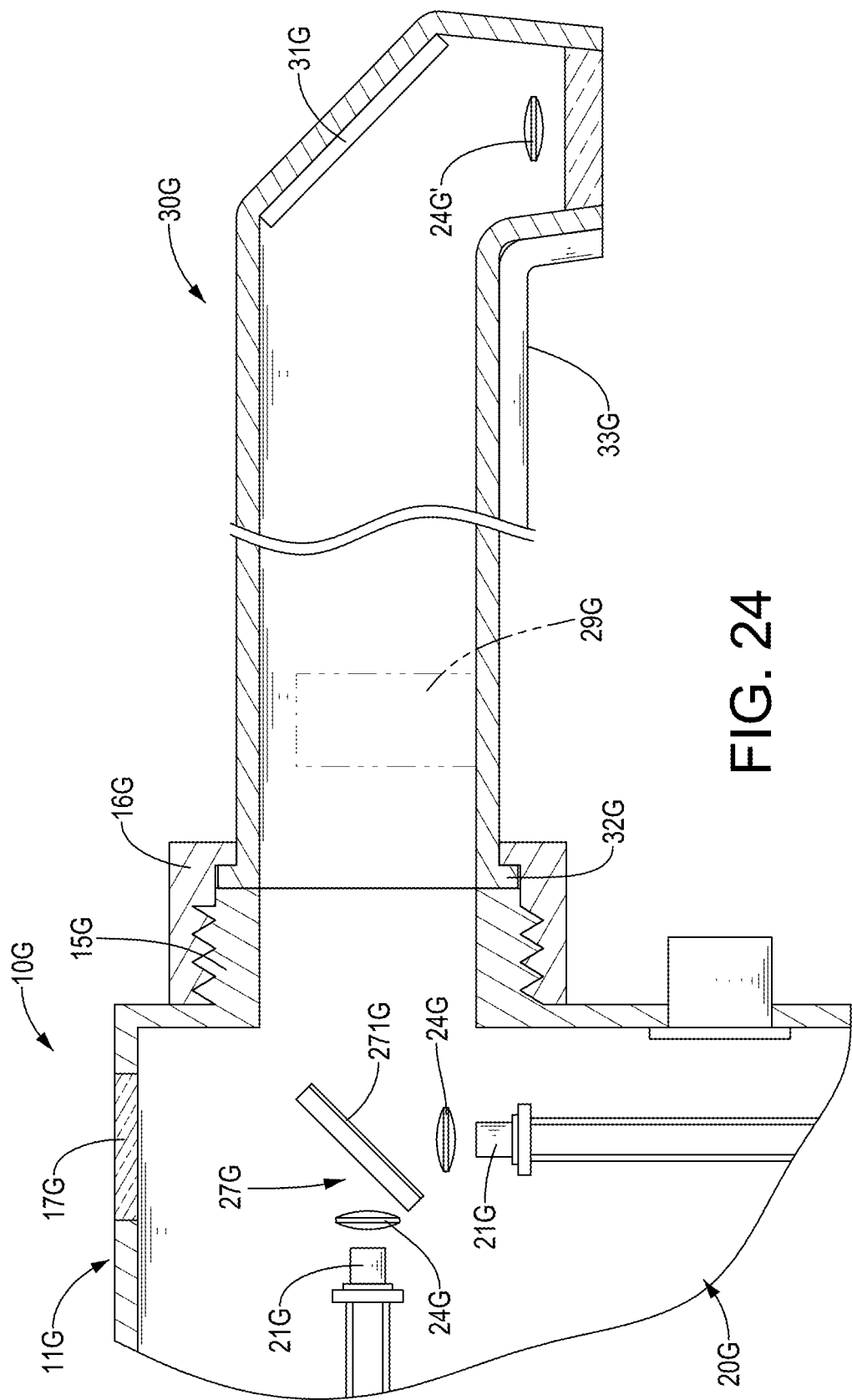
FIG. 24 is an enlarged side view in partial section of a seventh embodiment of a laser device for dentistry in accordance with the present invention.

With reference to FIG. 24, a seventh embodiment of a laser device for dentistry in accordance with the present invention is substantially the same as the second embodiment as shown in FIG. 6 and the third embodiment as shown in FIG. 15 except for the following features. In the seventh embodiment of the present invention, the connecting portion 15G of the outer casing 11G has a thread structure. The body 10G has a locking cover 16G which is hollow and has an opening. The light guiding pipe 30G has an engaging flange 32G annularly formed on and protruded from an end thereof that is faced to the body 10G. The other end of the light guiding pipe 30G extends through the locking cover 16G to enable the engaging flange 32G to abut against an interior of the locking cover 16G, and the locking cover 16G is connected to the connecting portion 15G to connect the light guiding pipe 30G with the body 10G. The engagement between the locking cover 16G and the engaging flange 32G enables the light guiding pipe 30G to rotate relative to the body 10G. Then the end of the light guiding pipe 30G away from the body 10G can be rotated to adjust an angle of the light guiding pipe 30G relative to the body 10G according to a user's need.

Figure 25:
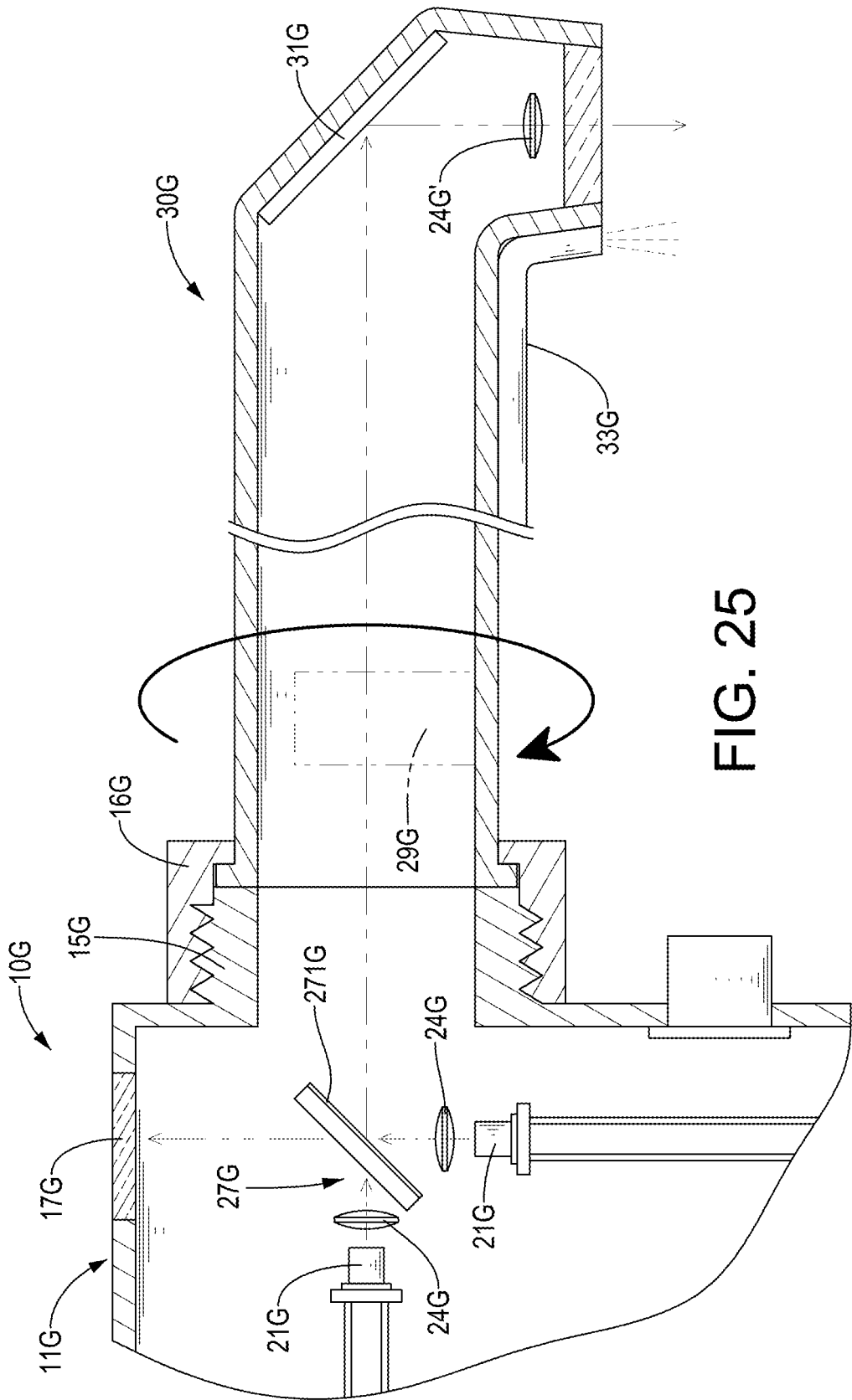
FIG. 25 is an operational side view of the laser device for dentistry in FIG. 24.

Furthermore, the light source group 20G has two light-emitting elements 21G and a pellicle mirror 27G. The two light-emitting elements 21G are disposed in the outer casing 11G at an included angle. Preferably, the two light-emitting elements 21G are disposed in the outer casing 11G at an included angle of 90 degrees, each one of the light-emitting elements 21G is a laser diode, and the wavelengths of the light-emitting elements 21G can be the same or different. The wavelength of one of the laser diodes is 405 nm and the wavelength of the other one of the laser diodes is 455 nm. The pellicle mirror 27G is disposed in the outer casing 11G between the two light-emitting elements 21G and has a dielectric film reflective layer 271G. The dielectric film reflective layer 271G is formed on the pellicle mirror 27G by coating titanium dioxide (TiO2) or silicon dioxide (SiO2) repeatedly and stacked on the pellicle mirror 27G. Different coating layers and thicknesses are designed according to the purpose of use (transmission, semi-reflection, semi-transmission or total reflection) to produce specific reflection or penetration effects. The dielectric film reflective layer 271G is formed on a side of the pellicle mirror 27G that is faced to the light guiding pipe 30G. With reference to FIG. 25, the lights of the two light-emitting elements 21G are overlapped and emitted toward the light guiding pipe 30G in a straight line after being refracted and transmitted by the pellicle mirror 27G, so that the light guiding pipe 30G emits a single light. Preferably, the dielectric film reflective layer 271G can be formed on the reflecting mirror 31G to provide a strong reflection effect. A viewing window 17G is formed on the outer casing 11G, using the above-mentioned design of the dielectric film coating, the laser light partially emitted through the viewing window 17G can be reduced by the dielectric film coating layer, and a user can observe whether the light source group 20G is activated via the viewing window 17G.

In addition, in the seventh embodiment of the laser device for dentistry of the present invention, a focusing lens 24G is disposed between the pellicle mirror 27G and each one of the two light-emitting elements 21G to first focus the light of each light-emitting element 21G by the corresponding focusing lens 24G, and then directly emit the light to the pellicle mirror 27G to improve the precision of the laser light. Furthermore, a collimating lens can be disposed between the pellicle mirror 27G and each one of the two light-emitting elements 21G, and a focusing lens 24G is disposed on a path of the light emitted by the pellicle mirror 27G. With two collimating lenses and one focusing lens 24G, the precision of the laser light can also be improved. In addition, a focusing lens 24G' can be selectively disposed in the light guiding pipe 30G adjacent to the reflecting mirror 31G to focus the laser light emitted by the reflecting mirror 31G. Further, a galvanometer module 29G is disposed on a front side of the light guiding pipe 30G to increase a scanning range of the laser light, so the energy of the laser light can be evenly distributed, and can reduced work time due to wide range of use.

When the seventh embodiment of the laser device for dentistry in accordance with the present invention is in use, two laser diodes with two different wavelengths (405 nm and 450 nm) can be applied to photopolymerization or polymerization of dental polymer materials (photo-polymerizer).

With reference to FIG. 25, an eighth embodiment of a laser device for dentistry in accordance with the present invention is substantially the same as the seventh embodiment as shown in FIG. 24 except for the following features. In the eighth embodiment of the present invention, the light guiding pipe 30G has a fluid tube 33G disposed on a bottom thereof to output liquid or gas to provide scavenging and cooling effects. In use, the laser diode of one of the two light-emitting elements 21G is a high-energy therapeutic light (invisible light, the light wavelength is 808 nm-Diode, 810-940 nm-AlGaAs, 1064 nm-InGaAsP, Nd-YAG, 1064 nm fiber laser, 2780 nm Meter-Er:Cr:YsGG and 2940 nm-Er:YGG) of the light source group 20G, and the laser diode of the other one of the two light-emitting elements 21G is a low-energy guided light (visible light, such as red light). The viewing window 17G is disposed on the outer casing 11G. Using the above-mentioned design of the dielectric film coating, the therapeutic light penetrates the pellicle mirror 27G strongly and is weakly reflected out of the viewing window 17G, the guide light (visible light, such as red light) half penetrates the pellicle mirror 27G and is half reflected out of the viewing window 17G. Then the invisible treatment light is emitted to the light guiding pipe 30G after passing through the pellicle mirror 27G. A part of the visible guided light is reflected by the pellicle mirror 27G and is overlapped with the invisible treatment light, and the other part of the visible guided light is transmitted through the pellicle mirror 27G and is emitted to the viewing window 17G as shown in FIG. 25. The user can observe whether the light source group 20G is activated through the viewing window 17G, and then it can be applied to clean and surface treatment (laser cleaning machine) of gums or artificial roots, so as to provide laser surface treatment for artificial roots, and can cut and cauterize soft and hard tissues in a non-contact way. Additionally, liquid or gas can be delivered through the fluid tube 33G under the light guiding pipe 30G for cleaning and cooling operations.

Figure 26:
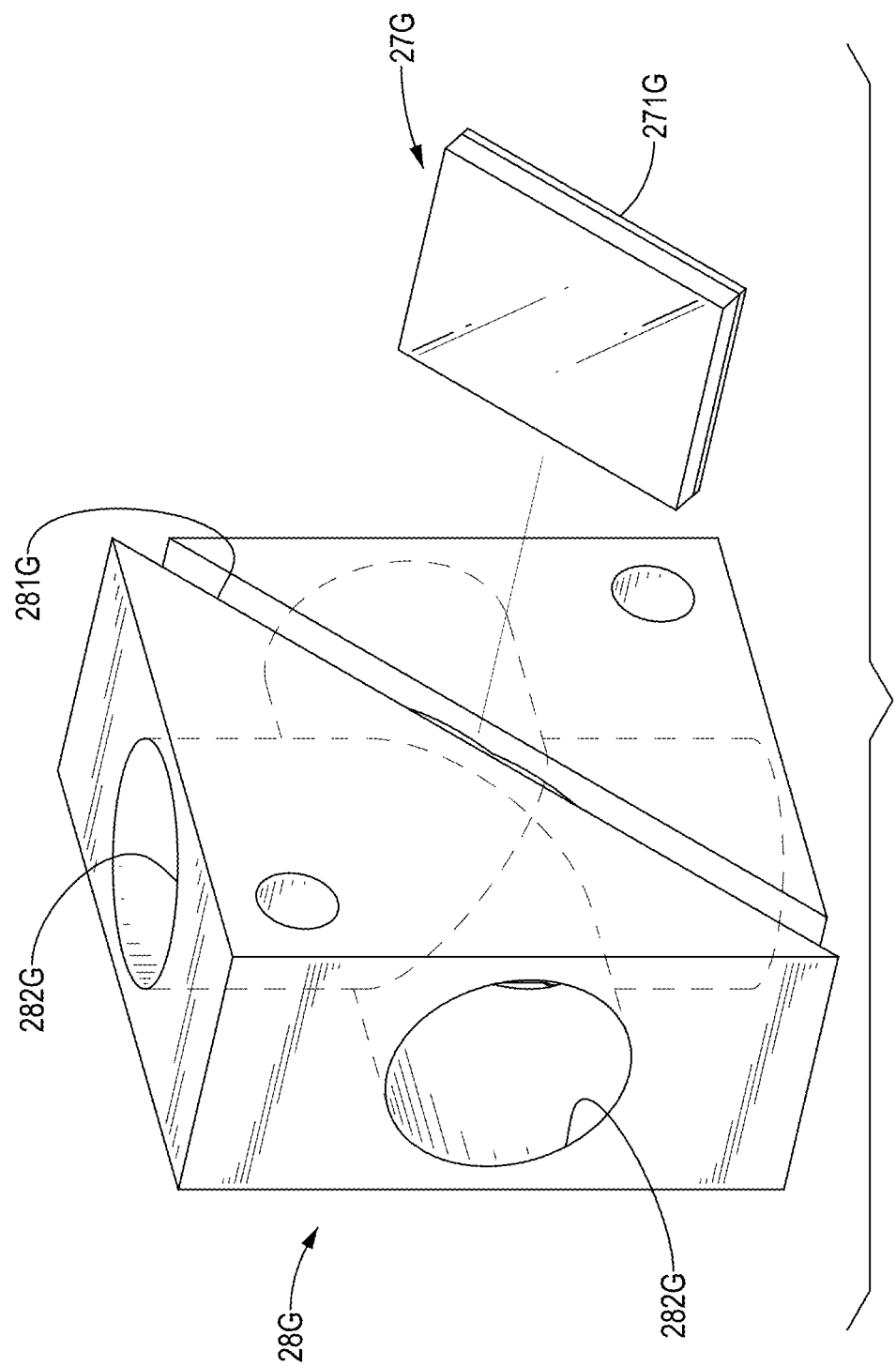
FIG. 26 is a perspective view of a clamping mount of the light source group of the laser device for dentistry in FIGS. 24 and 25.

Preferably, with reference to FIG. 26, in the seventh embodiment and the eighth embodiment of the laser device for dentistry of the present invention, a clamping mount 28G is disposed in the outer casing 11G to position the pellicle mirror 27G, and the clamping mount 28G is securely disposed in the outer casing 11G and has a positioning recess 281G and two guiding channels 282G. The positioning recess 281G is formed in a middle of the clamping mount 28G to hold the pellicle mirror 27G on the clamping mount 28G. The clamping mount 28G may be a rectangular block, and the positioning recess 281G is concavely formed on a diagonal line of the clamping mount 28G. Each one of the guiding channels 282G is formed through two opposite sides of the clamping mount 28G and communicates with the positioning recess 281G, and the two guiding channels 282G are disposed on the clamping mount 28G at an included angle. The lights of the two light-emitting elements 21G are respectively and directly emitted toward the pellicle mirror 27G for refraction and transmission via the two guiding channels 282G.

Figure 27:
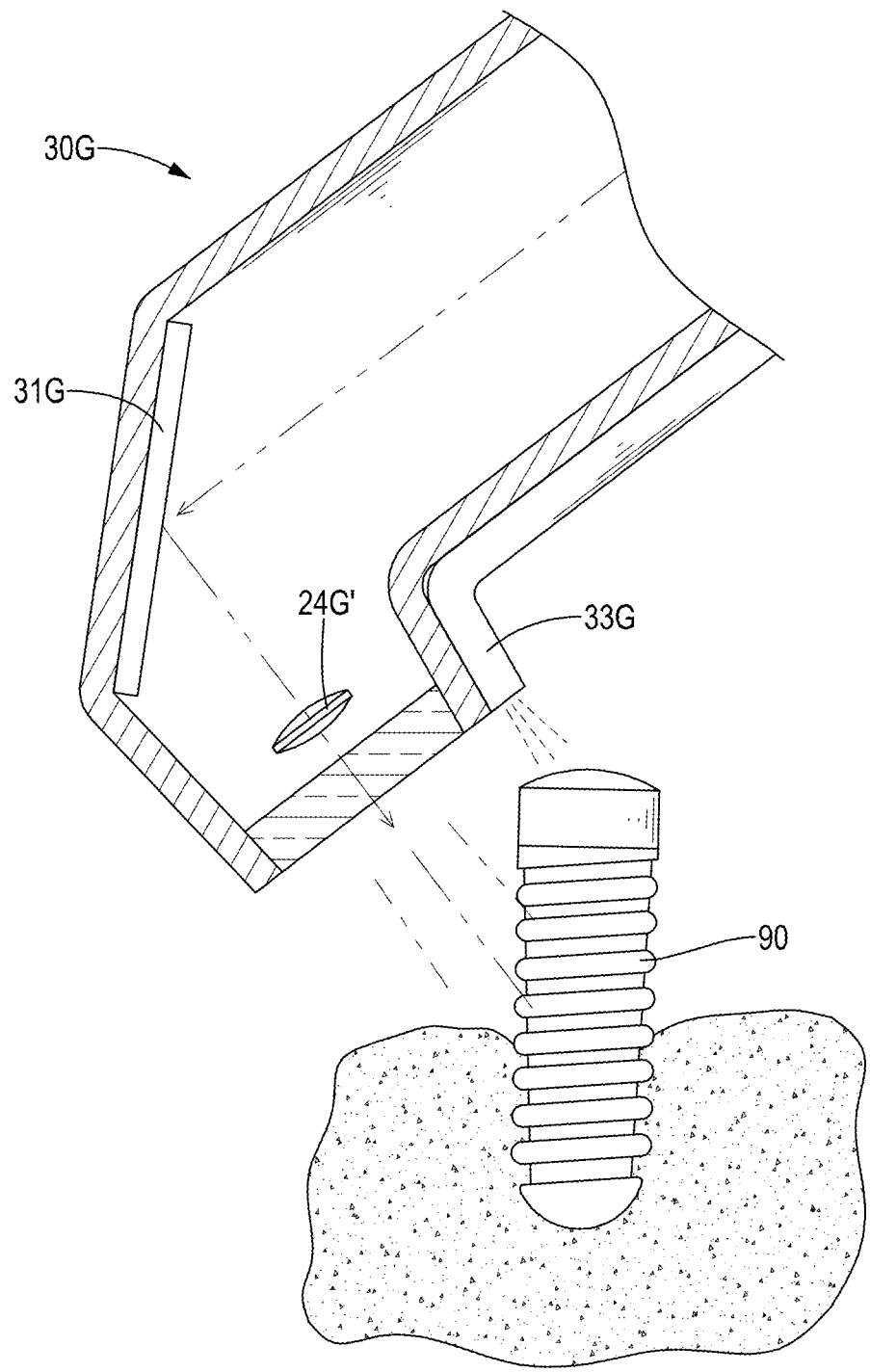
FIG. 27 is an operational side view of the laser device for dentistry in FIG. 25 for cleaning and treating an artificial root.
Figure 28:
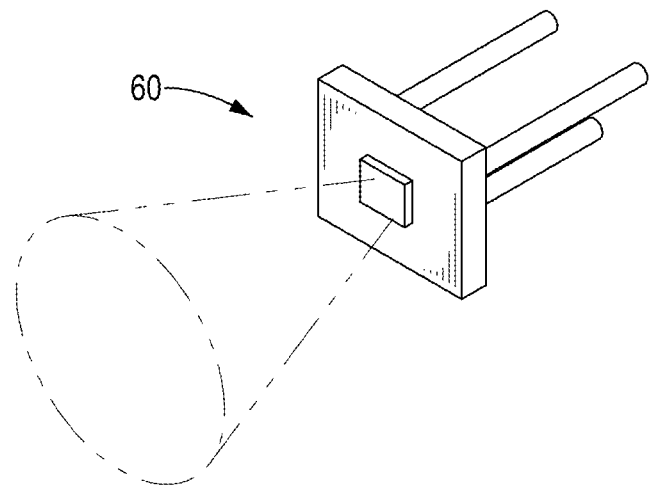
FIG. 28 is an operational perspective view of a light-emitting diode lamp in accordance with the prior art.
Figure 29:
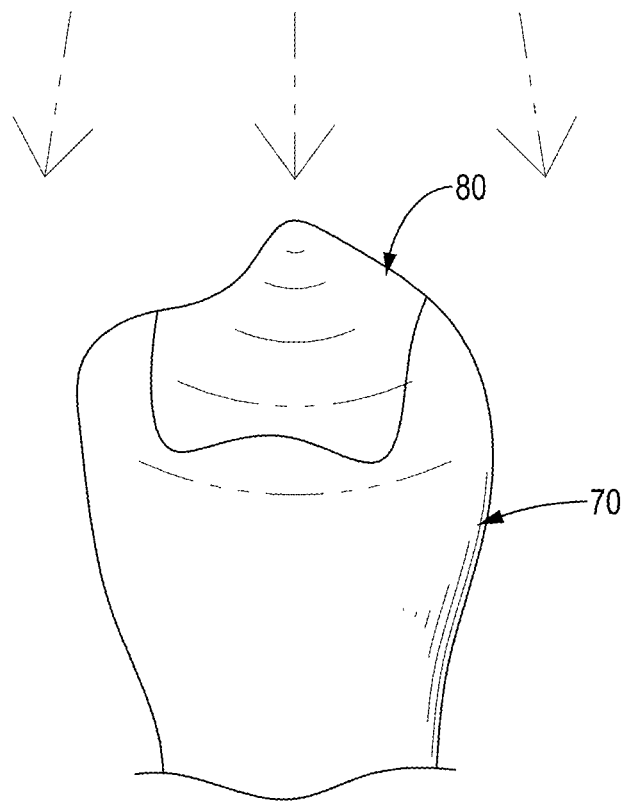
FIG. 29 is an operational side view of the light-emitting diode lamp for curing materials in a tooth.

With reference to FIG. 27, when the eighth embodiment of the laser device for dentistry in accordance with the present invention is in use, the light guiding pipe 30G is moved to an artificial root 90 to be cleaned and the light source group 20G (with 1064 nm fiber laser) is activated, wherein the light source group 20G of 1064 nm fiber laser uses optical fiber as the gain medium and light transmission medium of the laser diode, so as to increase the intensity of light to generate the laser light of 1064 nm. The laser light of 1064 nm is suitable for surface processing of metals, and water vapor, heme, and Hydroxyapatite (one of the main components of bone) have low absorption rates for the laser light of 1064 nm. During cleaning and surface treatment of the artificial roots 90, the laser light will not cause damage to the alveolar bone around the artificial root 90, and since the water vapor has a low light absorption rate of the laser light of 1064 nm, the water spray and cooling methods will not affect the effectiveness of the laser light, and it can effectively provide the effect of cleaning the artificial root 90 and reconstructing the laser surface treatment layer on the surface of the artificial root 90. When using a non-contact way on the treatment site, such as gums or artificial roots, it can reduce the loss and cost of materials (optical fibers) due to the use of non-contact irradiation methods, can clean the artificial roots 90 by light source irradiation and perform the laser surface treatment. Then the surface of the artificial roots 90 will not be scratched, so that the cleaned artificial roots 90 can be restored to the original metal surface state, which is conducive to the attachment of new bone, thereby improving stability of the artificial root 90 on the gums. In the process of cleaning the artificial root 90, water, water vapor or gas can be transported through the fluid tube 33G to remove impurities or provide a cooling effect.

According to the above-mentioned features and structural relationships of the laser device for dentistry of the present invention, the light source group 20A, 20B, 20C, 20D, 20E, 20G uses the laser diode (LD) as the light emitting element 21A, 21B, 21C, 21D, 21F, 21G, and is used with the reflector 22B, 22D, the collimating lenses 23A, 23B, 23C, 23D, and the focusing lenses 24B, 24C, 24D, 24G, 24G'. Then the lights emitted by the light source groups 20A, 20B, 20C, 20D, 20E, 20G have high penetrability, collimation, and coherence, and can be used in jewelry identification (whether there are cracks or other fillers), medical equipment disinfection, nail painting (cured pigments), and other fields. In addition, multiple laser devices for dentistry can be used with a box to form a space for disinfection in the box, and then it can be used in kitchen tableware or disinfection and sterilization of surgical equipment. Furthermore, the body 10A is portable due to its small size, and can be used by users as hand disinfection, so the laser device for dentistry of the present invention has a wide range of applications.

In dental use, the light of the light source group 20B can irradiate into the composite resin 80 filled in the tooth 70. Then photopolymerization is performed on the entire composite resin 80, the entire composite resin 80 can be photocured, which is relatively convenient in operation, saves time, and can improve the tightness of tooth filling. Furthermore, there are three light-emitting elements 21B with three different wavelengths disposed on the connecting portion 15B of the body 10B, or two light-emitting elements 21G arranged at an included angle are used with the pellicle mirror 27G as two single lights with different wavelengths that can be overlapped and arranged in a straight line. Therefore, when composite resins of different chemical materials are used, lights of corresponding wavelengths can be provided through the light-emitting elements 21B, 21G of different wavelengths. The composite resin 80 of different chemical materials can be photocured through a single laser device for dentistry, and there is no need to purchase multiple laser devices for dentistry. The cost for use can be reduced, the application range of the laser device for dentistry can be increased, and the composite resin 80 of different chemical materials can be accurately cured by light, effectively avoiding the phenomenon of inability to cure or incomplete curing and relatively improve the treatment quality of filling of tooth 70.

Furthermore, the light source group 20A, 20B, 20C, 20D, 20E, 20G of the laser device for dentistry of the present invention can generate at least one or more lights with the same (synchronized) or different wavelengths (non-synchronized), so that users can use them according to their needs, and can increase the light intensity or increase the use range of the light by adding the lights. When it is used on the treatment site, such as gums or artificial roots, in a non-contact way, it can reduce the loss and cost of materials, such as optical fibers, due to the use of non-contact irradiation methods, and can use light irradiation to clean artificial teeth. The artificial root 90 is treated with a laser surface, the surface of the artificial root 90 will not be scratched, and the cleaned artificial root 90 can be restored to the original metal surface state, which is conducive to the attachment of new bone, improve the stability of the artificial root 90 on the gum, provide a laser device for dentistry that improves curing effect, increases application range, and is convenient to use.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A laser device for dentistry comprising:
   a body having
   an outer casing having a connecting portion disposed on a free end thereof;
   an operating module disposed on the outer casing; and
   a controlling module disposed in the outer casing and electrically connected to the operating module;
   a light source group disposed in the body and having multiple light-emitting elements, each one of the light-emitting elements disposed at the connecting portion of the outer casing, electrically connected to the controlling module, and being a laser diode;
   a reflector disposed on the connecting portion of the outer casing and covering the multiple light-emitting elements;
   a collimating lens disposed on a side of the reflector away from the multiple light-emitting elements; and
   a focusing lens disposed on a side of the collimating lens away from the reflector;
   a light guiding pipe detachably connected to the connecting portion of the body, located on a front side of the light source group for guiding light of the light source group out of the laser device for dentistry, and having a reflecting mirror disposed in the light guiding pipe; and
   a holding group disposed in the light guiding pipe for holding the reflecting mirror and having
   a fixing panel securely connected to the connecting portion of the outer casing;
   a supporting arm connected to the fixing panel; and
   a supporting frame connected to the supporting arm and the reflecting mirror.

2. The laser device for dentistry as claimed in claim 1, wherein
   the reflector has a reflecting surface tapered outward from the multiple light-emitting elements; and
   the connecting portion has a concave mirror disposed behind the multiple light-emitting elements;
   wherein the lights of the multiple light-emitting elements are emitted out of the reflector as reflected by the reflecting surface and the concave mirror.

3. The laser device for dentistry as claimed in claim 2, wherein the reflector is a total reflection mirror.

4. The laser device for dentistry as claimed in claim 3, wherein the light source group has three laser diodes disposed on the connecting portion at spaced intervals, and the wavelengths of the three laser diodes are 405 nanometers, 455 nanometers, and 488 nanometers, respectively.

5. The laser device for dentistry as claimed in claim 4, wherein the operating module of the body controls the three laser diodes via the controlling module to make the three laser diodes emit light simultaneously or individually or controls two of the three laser diodes to emit light.

6. The laser device for dentistry as claimed in claim 5, wherein each light-emitting element is an edge emitting laser diode, a surface emitting laser diode or a stack laser diode.

7. The laser device for dentistry as claimed in claim 3, wherein the light source group has three light-emitting elements disposed on the connecting portion at spaced intervals, the three light-emitting elements are three laser diodes with three primary colors, respectively, the light source group respectively generate light of three primary colors after being activated, and the laser device emits white light or mixes laser light with other wavelengths.

8. The laser device for dentistry as claimed in claim 3, wherein the body has a shading plate disposed on the connecting portion of the outer casing.

9. The laser device for dentistry as claimed in claim 8, wherein the outer casing is formed by two half shells connected to each other.

10. The laser device for dentistry as claimed in claim 9, wherein the operating module has
multiple control buttons disposed on the outer casing; and
a display disposed on the outer casing.

11. The laser device for dentistry as claimed in claim 3, wherein
the outer casing is formed by two half shells connected to each other; and
the operating module has
multiple control buttons disposed on the outer casing; and
a display disposed on the outer casing.

12. The laser device for dentistry as claimed in claim 3, wherein
the supporting frame has
two holding tabs respectively disposed on two sides of the supporting frame at a spaced interval; and
a linking tab disposed on a middle of the supporting frame between the two holding tabs to form a holding space between the two holding tabs and the linking tab;
the supporting arm has a connecting segment formed on an end thereof opposite to the fixing panel and connected to the linking tab; and
the reflecting mirror is mounted in the holding space of the supporting frame.

13. The laser device for dentistry as claimed in claim 12, wherein the holding group has a fastener connected to the linking tab of the supporting frame and the connecting segment of the supporting arm.

14. The laser device for dentistry as claimed in claim 2, wherein the light source group has three laser diodes disposed on the connecting portion at spaced intervals, and the wavelengths of the three laser diodes are 405 nanometers, 455 nanometers, and 488 nanometers, respectively.

15. The laser device for dentistry as claimed in claim 14, wherein the operating module of the body controls the three laser diodes via the controlling module to make the three laser diodes emit light simultaneously or individually or controls two of the three laser diodes to emit light.

16. The laser device for dentistry as claimed in claim 15, wherein each light-emitting element is an edge emitting laser diode, a surface emitting laser diode or a stack laser diode.

17. The laser device for dentistry as claimed in claim 2, wherein the light source group has three light-emitting elements disposed on the connecting portion at spaced intervals, the three light-emitting elements are three laser diodes with three primary colors, respectively, the light source group respectively generate light of three primary colors after being activated, and the laser device emits white light or mixes laser light with other wavelengths.

18. The laser device for dentistry as claimed in claim 2, wherein the body has a shading plate disposed on the connecting portion of the outer casing.

19. The laser device for dentistry as claimed in claim 18, wherein the outer casing is formed by two half shells connected to each other.

20. The laser device for dentistry as claimed in claim 19, wherein the operating module has
multiple control buttons disposed on the outer casing; and
a display disposed on the outer casing.

21. The laser device for dentistry as claimed in claim 2, wherein
the outer casing is formed by two half shells connected to each other; and
the operating module has
multiple control buttons disposed on the outer casing; and
a display disposed on the outer casing.

22. The laser device for dentistry as claimed in claim 2, wherein
the supporting frame has
two holding tabs respectively disposed on two sides of the supporting frame at a spaced interval; and
a linking tab disposed on a middle of the supporting frame between the two holding tabs to form a holding space between the two holding tabs and the linking tab;
the supporting arm has a connecting segment formed on an end thereof opposite to the fixing panel and connected to the linking tab; and
the reflecting mirror is mounted in the holding space of the supporting frame.

23. The laser device for dentistry as claimed in claim 22, wherein the holding group has a fastener connected to the linking tab of the supporting frame and the connecting segment of the supporting arm.

24. The laser device for dentistry as claimed in claim 1, wherein the light source group has three laser diodes disposed on the connecting portion at spaced intervals, and the wavelengths of the three laser diodes are 405 nanometers, 455 nanometers, and 488 nanometers, respectively.

25. The laser device for dentistry as claimed in claim 24, wherein the operating module of the body controls the three laser diodes via the controlling module to make the three laser diodes emit light simultaneously or individually or controls two of the three laser diodes to emit light.

26. The laser device for dentistry as claimed in claim 25, wherein each light-emitting element is an edge emitting laser diode, a surface emitting laser diode or a stack laser diode.

27. The laser device for dentistry as claimed in claim 1, wherein the light source group has three light-emitting elements disposed on the connecting portion at spaced intervals, the three light-emitting elements are three laser diodes with three primary colors, respectively, the light source group respectively generate light of three primary colors after being activated, and the laser device emits white light or mixes laser light with other wavelengths.

28. The laser device for dentistry as claimed in claim 1, wherein the body has a shading plate disposed on the connecting portion of the outer casing.

29. The laser device for dentistry as claimed in claim 28, wherein the outer casing is formed by two half shells connected to each other.

30. The laser device for dentistry as claimed in claim 29, wherein the operating module has
multiple control buttons disposed on the outer casing; and
a display disposed on the outer casing.

31. The laser device for dentistry as claimed in claim 1, wherein
the outer casing is formed by two half shells connected to each other; and
the operating module has
multiple control buttons disposed on the outer casing; and
a display disposed on the outer casing.

32. The laser device for dentistry as claimed in claim 1, wherein
the supporting frame has
two holding tabs respectively disposed on two sides of the supporting frame at a spaced interval; and
a linking tab disposed on a middle of the supporting frame between the two holding tabs to form a holding space between the two holding tabs and the linking tab;
the supporting arm has a connecting segment formed on an end thereof opposite to the fixing panel and connected to the linking tab; and
the reflecting mirror is mounted in the holding space of the supporting frame.

33. The laser device for dentistry as claimed in claim 32, wherein the holding group has a fastener connected to the linking tab of the supporting frame and the connecting segment of the supporting arm.

34. The laser device for dentistry as claimed in claim 1, wherein the laser device for dentistry has a filter cover, and the filter cover is connected to the light guiding pipe and has
an outer cover portion being a conical body that gradually expands outward from the light guiding pipe; and
an inner guide portion disposed in the outer cover portion and tapered outward from the light guiding pipe.

35. The laser device for dentistry as claimed in claim 1, wherein each light-emitting element of the light source group is an edge emitting laser diode with multiple lights to emit lights with the same or different wavelengths to provide effects of single with multi-wavelength or single with single wavelength.

36. The laser device for dentistry as claimed in claim 35, wherein each light-emitting element of the light source group has multiple resonant cavities that are formed on a semiconductor substrate through a semiconductor manufacturing process, and the resonant cavities generate lights of the same wavelength or different wavelengths to enable the lights.

37. The laser device for dentistry as claimed in claim 36, wherein each light-emitting element of the light source group has three resonant cavities, the three resonant cavities respectively generate three primary colors of lights after being excited, and the light-emitting element emits a white light or laser light of other wavelengths after addition of the three primary colors of lights.

38. The laser device for dentistry as claimed in claim 1, wherein each light-emitting element of the light source group is a stack laser diode, and the stack laser diode has effects of single with multi-wavelength or single with single wavelength.

39. The laser device for dentistry as claimed in claim 1, wherein the light of each light-emitting element of the light source group is selected and configured according to the characteristics of dental polymer materials to polymerize the dental polymer materials.

40. The laser device for dentistry as claimed in claim 1, wherein
the connecting portion of the outer casing has a thread structure;
the body has a locking cover connected to the thread structure of the connecting portion;
the light guiding pipe has an engaging flange formed on and protruded from an end thereof that is faced to the body and abutted against an interior of the locking cover to enable the light guiding pipe to rotate relative to the body; and
the light source group has
two light-emitting elements disposed in the outer casing at an included angle; and
a pellicle mirror disposed in the outer casing between the two light-emitting elements and having a dielectric film reflective layer formed on a side of the pellicle mirror that is faced to the light guiding pipe;
wherein lights of the two light-emitting elements are overlapped and emitted toward the light guiding pipe in a straight line after being refracted and transmitted by the pellicle mirror.

41. The laser device for dentistry as claimed in claim 40, wherein the two light-emitting elements are disposed in the outer casing at an included angle of 90 degrees.

42. The laser device for dentistry as claimed in claim 41, wherein a focusing lens is disposed between the pellicle mirror and each one of the two light-emitting elements to first focus the light of each light-emitting element by the corresponding focusing lens, and then directly emit the light to the pellicle mirror.

43. The laser device for dentistry as claimed in claim 42, wherein
a clamping mount is disposed in the outer casing to position the pellicle mirror, and the clamping mount is securely disposed in the outer casing and has
a positioning recess formed in a middle of the clamping mount to hold the pellicle mirror on the clamping mount; and
two guiding channels, and each one of the guiding channels formed through two opposite sides of the clamping mount and communicating with the positioning recess; and
the lights of the two light-emitting elements are respectively and directly emitted toward the pellicle mirror for refraction and transmission via the two guiding channels.

44. The laser device for dentistry as claimed in claim 42, wherein the light of one of the light-emitting elements is an invisible light, the light of other one of the light-emitting elements is a visible light, the invisible light is a therapeutic light, and the visible light is a guided light.

45. The laser device for dentistry as claimed in claim 42, wherein the light guiding pipe has a fluid tube disposed on an exterior thereof to output fluid.

46. The laser device for dentistry as claimed in claim 42, wherein the laser device for dentistry is configured to perform a laser surface treatment of artificial roots and to cut and cauterize soft and hard tissues in a non-contact way.

47. The laser device for dentistry as claimed in claim 42, wherein the outer casing has a viewing window formed on the outer casing for observation.

48. The laser device for dentistry as claimed in claim 42, wherein the light of each light-emitting element of the light source group is selected and configured according to the characteristics of dental polymer materials to polymerize the dental polymer materials.

49. The laser device for dentistry as claimed in claim 41, wherein
a collimating lens is disposed between the pellicle mirror and each one of the two light-emitting elements; and
a focusing lens is disposed on a path of the light emitted by the pellicle mirror.

50. The laser device for dentistry as claimed in claim 49, wherein
a clamping mount is disposed in the outer casing to position the pellicle mirror, and the clamping mount is securely disposed in the outer casing and has a positioning recess formed in a middle of the clamping mount to hold the pellicle mirror on the clamping mount; and two guiding channels, and each one of the guiding channels formed through two opposite sides of the clamping mount and communicating with the positioning recess; and the lights of the two light-emitting elements are respectively and directly emitted toward the pellicle mirror for refraction and transmission via the two guiding channels.

51. The laser device for dentistry as claimed in claim 49, wherein the light of one of the light-emitting elements is an invisible light, the light of other one of the light-emitting elements is a visible light, the invisible light is a therapeutic light, and the visible light is a guided light.

52. The laser device for dentistry as claimed in claim 49, wherein the light guiding pipe has a fluid tube disposed on an exterior thereof to output fluid.

53. The laser device for dentistry as claimed in claim 49, wherein the laser device for dentistry is configured to perform a laser surface treatment of artificial roots and to cut and cauterize soft and hard tissues in a non-contact way.

54. The laser device for dentistry as claimed in claim 49, wherein the outer casing has a viewing window formed on the outer casing for observation.

55. The laser device for dentistry as claimed in claim 49, wherein the light of each light-emitting element of the light source group is selected and configured according to the characteristics of dental polymer materials to polymerize the dental polymer materials.

56. The laser device for dentistry as claimed in claim 41, wherein
a clamping mount is disposed in the outer casing to position the pellicle mirror, and the clamping mount is securely disposed in the outer casing and has
a positioning recess formed in a middle of the clamping mount to hold the pellicle mirror on the clamping mount; and
two guiding channels, and each one of the guiding channels formed through two opposite sides of the clamping mount and communicating with the positioning recess; and
the lights of the two light-emitting elements are respectively and directly emitted toward the pellicle mirror for refraction and transmission via the two guiding channels.

57. The laser device for dentistry as claimed in claim 41, wherein the light of one of the light-emitting elements is an invisible light, the light of other one of the light-emitting elements is a visible light, the invisible light is a therapeutic light, and the visible light is a guided light.

58. The laser device for dentistry as claimed in claim 41, wherein the light guiding pipe has a fluid tube disposed on an exterior thereof to output fluid.

59. The laser device for dentistry as claimed in claim 41, wherein the laser device for dentistry is configured to perform a laser surface treatment of artificial roots and to cut and cauterize soft and hard tissues in a non-contact way.

60. The laser device for dentistry as claimed in claim 41, wherein the outer casing has a viewing window formed on the outer casing for observation.

61. The laser device for dentistry as claimed in claim 41, wherein the light of each light-emitting element of the light source group is selected and configured according to the characteristics of dental polymer materials to polymerize the dental polymer materials.

62. The laser device for dentistry as claimed in claim 40, wherein
a clamping mount is disposed in the outer casing to position the pellicle mirror, and the clamping mount is securely disposed in the outer casing and has
a positioning recess formed in a middle of the clamping mount to hold the pellicle mirror on the clamping mount; and
two guiding channels, and each one of the guiding channels formed through two opposite sides of the clamping mount and communicating with the positioning recess; and
the lights of the two light-emitting elements are respectively and directly emitted toward the pellicle mirror for refraction and transmission via the two guiding channels.

63. The laser device for dentistry as claimed in claim 40, wherein the light of one of the light-emitting elements is an invisible light, the light of other one of the light-emitting elements is a visible light, the invisible light is a therapeutic light, and the visible light is a guided light.

64. The laser device for dentistry as claimed in claim 40, wherein the light guiding pipe has a fluid tube disposed on an exterior thereof to output fluid.

65. The laser device for dentistry as claimed in claim 40, wherein the light of each light-emitting element of the light source group is selected and configured according to the characteristics of dental polymer materials to polymerize the dental polymer materials.

66. The laser device for dentistry as claimed in claim 40, wherein the laser device for dentistry is configured to perform a laser surface treatment of artificial roots and to cut and cauterize soft and hard tissues in a non-contact way.

67. The laser device for dentistry as claimed in claim 40, wherein the outer casing has a viewing window formed on the outer casing for observation.

* * * * *